United States Patent
Li et al.

(10) Patent No.: US 11,070,287 B2
(45) Date of Patent: Jul. 20, 2021

(54) METHOD AND APPARATUS FOR ESTABLISHING TRANSMISSION IMPAIRMENT DECOMPOSITION MODEL FOR RAMAN AMPLIFIED SYSTEM AND SYSTEM

(71) Applicant: Fujitsu Limited, Kawasaki (JP)

(72) Inventors: Jingnan Li, Beijing (CN); Zhenning Tao, Beijing (CN); Yangyang Fan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/018,180

(22) Filed: Sep. 11, 2020

(65) Prior Publication Data
US 2021/0111789 A1    Apr. 15, 2021

(30) Foreign Application Priority Data
Oct. 15, 2019    (CN) .......................... 201910977150.0

(51) Int. Cl.
*H04B 10/077*    (2013.01)
*H04B 10/564*    (2013.01)
(Continued)

(52) U.S. Cl.
CPC ........... *H04B 10/077* (2013.01); *H01S 3/302* (2013.01); *H04B 10/07955* (2013.01); *H04B 10/2537* (2013.01); *H04B 10/564* (2013.01)

(58) Field of Classification Search
None
See application file for complete search history.

(56) References Cited

U.S. PATENT DOCUMENTS

| 2001/0010585 A1* | 8/2001 | Nishimura | ......... H04B 10/2916 398/79 |
| 2003/0053173 A1* | 3/2003 | Patel | ....................... H04J 14/02 398/152 |

(Continued)

FOREIGN PATENT DOCUMENTS

| CN | 102884736 A | 1/2013 |
| CN | 103728118 A | 4/2014 |

OTHER PUBLICATIONS

Liu, "Distributed Fiberoptic Sensors for Vibration Detection", 2016, Sensors, 16(8), 1164, https://doi.org/10.3390/s16081164 (Year: 2016).*

(Continued)

*Primary Examiner* — Darren E Wolf
(74) *Attorney, Agent, or Firm* — Staas & Halsey LLP

(57) ABSTRACT

Embodiments of this disclosure provide a method and apparatus for establishing a transmission impairment decomposition model for a Raman amplified system and a system. The method includes: converting a Jones vector of a test signal after passing through a Raman amplified system into a Stokes vector; calculating transmission impairments to which the test signal is subjected by using the Stokes vector according to a pre-established transmission impairment decomposition model; and substituting values of the transmission impairments into the pre-established transmission impairment decomposition model to obtain a complete transmission impairment decomposition model used for estimating transmission impairments.

12 Claims, 5 Drawing Sheets

(51) Int. Cl.
   *H01S 3/30*      (2006.01)
   *H04B 10/2537*   (2013.01)
   *H04B 10/079*    (2013.01)

(56) References Cited

U.S. PATENT DOCUMENTS

| | | | | |
|---|---|---|---|---|
| 2004/0067062 | A1* | 4/2004 | Stefany | G02F 1/0136 |
| | | | | 398/147 |
| 2007/0252986 | A1* | 11/2007 | Sandstrom | G01B 9/0209 |
| | | | | 356/319 |
| 2008/0232804 | A1* | 9/2008 | Absillis | H04J 3/14 |
| | | | | 398/71 |
| 2010/0296155 | A1 | 11/2010 | Sergeyev | |
| 2011/0122787 | A1* | 5/2011 | Wang | H04B 17/336 |
| | | | | 370/252 |
| 2015/0117853 | A1 | 4/2015 | Zhang et al. | |
| 2015/0333826 | A1* | 11/2015 | Farrell | H04B 10/07955 |
| | | | | 398/38 |
| 2016/0204894 | A1 | 7/2016 | Dong et al. | |
| 2016/0323900 | A1* | 11/2016 | De Domenico | H04W 16/32 |
| 2017/0285207 | A1* | 10/2017 | Shao | H02J 50/80 |
| 2017/0351241 | A1* | 12/2017 | Bowers | G05B 13/048 |

OTHER PUBLICATIONS

Kersey, "Distributed and multiplexed fibre-optic sensor systems", 1988, Journal of the Institution of Electronic and Radio Engineers, vol. 58, No. 5 (Supplement), p. S99-S111, (Year: 1988).*
Schenato, "A review of distribed fibre optic sensors for geo-hydrological applications", 2017, Applied Sciences, Appl. Sci. 2017, 7, 896; doi:10.3390/app7090896 (Year: 2017).*
Wei Leping, "Transmission Impairments for Optical Amplified Systems", Sep. 20, 1999 China Academy of Telecom. Research.
C.R.S. Fludger et al., "Pump to Signal RIN Transfer in Raman Fiber Amplifiers", Aug. 2001 Journal of Lightwave Technology, vol. 19, No. 8, pp. 1140-1148.
Liang Xu et al., "Experimental verification of relative phase noise in Raman amplified coherent optical communication system", 2016 Journal of Lightwave Technology, vol. 34, No. 16, pp. 3711-3716.

* cited by examiner

METHOD AND APPARATUS FOR ESTABLISHING TRANSMISSION IMPAIRMENT DECOMPOSITION MODEL FOR RAMAN AMPLIFIED SYSTEM AND SYSTEM

CROSS-REFERENCE TO RELATED APPLICATIONS

This application is based on and hereby claims priority to Chinese Application No. 201910977150.0, filed Oct. 15, 2019, in the State Intellectual Property Office of China, the disclosure of which is incorporated herein by reference.

FIELD

This disclosure relates to the field of optical communications.

BACKGROUND

In an optical communications system, in comparison with a lumped Erbium doped fiber amplifier (EDFA), a Raman fiber amplified system (briefly referred to as a Raman amplified system) is a distributed amplified system, which has a lower noise coefficient, thus having longer transmission distance. And on the other hand, the Raman amplified system allows an optical signal to have a lower fiber incident power, thereby reducing a nonlinear effect of fiber transmission.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to one aspect of the embodiments of this disclosure, there is provided a method for establishing a transmission impairment decomposition model for a Raman amplified system, wherein the method includes:

converting a Jones vector of a test signal after passing through a Raman amplified system into a Stokes vector;

calculating transmission impairments to which the test signal is subjected by using the Stokes vector according to a pre-established transmission impairment decomposition model; and substituting values of the transmission impairments into the pre-established transmission impairment decomposition model to obtain a complete transmission impairment decomposition model used for estimating transmission impairments.

According to another aspect of the embodiments of this disclosure, there is provided a method for estimating a bit error penalty of a Raman amplified system, wherein the method includes:

estimating a bit error penalty introduced into optical signals by total impairments and single impairments in a Raman amplified system by using a complete transmission impairment decomposition model established in the above-described method; and determining primary impairments and secondary impairments in the Raman amplified system according to a magnitude of the bit error penalty introduced by the single impairments.

According to a further aspect of the embodiments of this disclosure, there is provided an apparatus for establishing a transmission impairment decomposition model for a Raman amplified system, wherein the apparatus includes:

a first converting unit configured to convert a Jones vector of a test signal after passing through a Raman amplified system into a Stokes vector;

a first calculating unit configured to calculate transmission impairments to which the test signal is subjected by using the Stokes vector according to a pre-established transmission impairment decomposition model; and a first processing unit configured to substitute values of the transmission impairments into the pre-established transmission impairment decomposition model to obtain a complete transmission impairment decomposition model used for estimating transmission impairments.

According to yet another aspect of the embodiments of this disclosure, there is provided an apparatus for estimating a bit error penalty of a Raman amplified system, wherein the apparatus includes:

an estimating unit configured to, by using a complete transmission impairment decomposition model established by the above-described establishment apparatus, estimate a bit error penalty introduced into optical signals by total impairments and single impairments in a Raman amplified system; and an evaluating unit configured to determine primary impairments and secondary impairments in the Raman amplified system according to a magnitude of the bit error penalty introduced by the single impairments.

According to still another aspect of the embodiments of this disclosure, there is provided a Raman amplified system, including the above-described apparatus for establishing a transmission impairment decomposition model and apparatus for estimating a bit error penalty.

According to a still further aspect of the embodiments of this disclosure, there is provided a computer program, wherein when the program is executed in a Raman amplified system, the program causes the Raman amplified system to carry out the above-described method for establishing a transmission impairment decomposition model or method for estimating a bit error penalty.

According to a yet further aspect of the embodiments of this disclosure, there is provided a storage medium storing a computer readable program, wherein the computer readable program causes a Raman amplified system to carry out the above-described method for establishing a transmission impairment decomposition model or method for estimating a bit error penalty.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
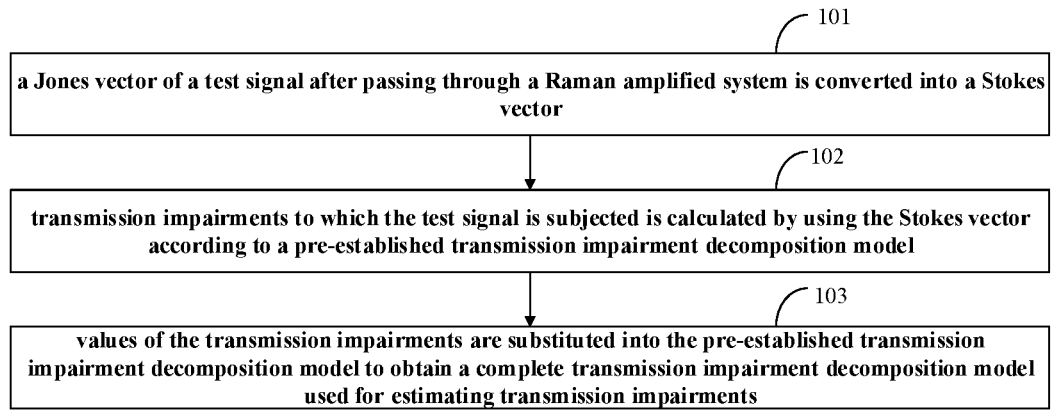
FIG. 1 is a schematic diagram of the method for establishing a transmission impairment decomposition model of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Various implementations of the embodiments of this disclosure shall be described below with reference to the accompanying drawings.

It was found by the inventors that a relative intensity noise (RIN) of a pump laser in a Raman amplified system will generate a gain fluctuation through a Raman effect, and generate cross polarization modulation (XPolM) and cross phase modulation (XPM) through a fiber nonlinear effect (such as the Kerr effect). These different types of impairments will deteriorate the quality of optical signal, thereby increasing a bit error penalty of the optical communications system. What is more difficult is that these different types of impairments all act on the optical communications system, and when they are mixed together, they will bring obstacles to system impairment analysis and system improvement.

In order to solve at least one of the above problems or other similar problems, embodiments of this disclosure provide a method and apparatus for establishing a transmission impairment decomposition model for a Raman amplified system and a system.

An advantage of the embodiments of this disclosure exists in that according to the embodiments of this disclosure, various complex impairments of the Raman amplified system that are mixed together may be analyzed efficiently, which is helpful for understanding, analysis and improvement of an optical fiber transmission system.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

A First Aspect of the Embodiments

The first aspect of the embodiments of this disclosure provides a method for establishing a transmission impairment decomposition model for a Raman amplified system.

FIG. 1 is a schematic diagram of the method for establishing a transmission impairment decomposition model of the embodiment of this disclosure. As shown in FIG. 1, the method includes:

operation 101: a Jones vector of a test signal after passing through a Raman amplified system is converted into a Stokes vector;

operation 102: transmission impairments to which the test signal is subjected is calculated by using the Stokes vector according to a pre-established transmission impairment decomposition model; and operation 103: values of the transmission impairments are substituted into the pre-established transmission impairment decomposition model to obtain a complete transmission impairment decomposition model used for estimating transmission impairments.

According to the embodiments of this disclosure, various complex impairments of the Raman amplified system that are mixed together may be analyzed efficiently, which is helpful for understanding, analysis and improvement of an optical fiber transmission system.

In the embodiment of this disclosure, first, a continuous wave signal is used as a probe signal (i.e. the above test signal) and passes through the Raman amplified system, so as to make it have a transmission impairment. Then according to a signal received by a coherent optical receiver, a Jones vector of the optical signal is reconstructed, after Stokes space conversion, a corresponding Stokes vector is obtained, and spectrum and autocorrelation analysis is performed on the Stokes vector. As different impairments in the Raman amplified system have different characteristics on the Stokes vector, these impairments are distinguished. And finally, based on the above result, an impairment separation transmission model is constructed to estimate an amount of each impairment.

Figure 2:
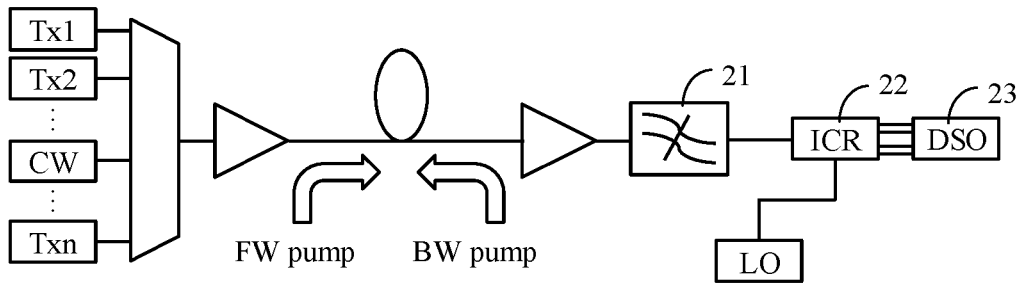
FIG. 2 is a schematic diagram of obtaining transmission impairments of the Raman amplified system by taking a continuous wave signal as a probe signal.

FIG. 2 is a schematic diagram of obtaining transmission impairments of the Raman amplified system by taking a continuous wave signal as a probe signal. As shown in FIG. 2, at a transmitter end, a path of continuous wave (CW) signal and a number of normal communications signals (Tx1, Tx2, ... Txn) are coupled into the Raman amplified system together. The Raman amplified system may be of a forward pump (FW pump) structure, or a backward pump (BW bump) structure, or a structure that pumps forward and backward at the same time. At the receiver end, an optical filter 21 is used to filter out the continuous wave signal, and a local oscillator (LO) signal with a certain frequency difference is used to achieve reception at a coherent receiver (ICR) 22. Thereafter, four paths of electrical signals outputted by the ICR are collected by a digital storage oscilloscope (DSO) 23.

According to the four paths of electrical signals XI, XQ, YI and YQ obtained by sampling by the DSO, after removing a frequency difference between the continuous wave and the local oscillator, a Jones vector $[E_x, E_y]^T=[XI+jXQ, YI+jYQ]^T$ of the original optical signal, i.e. the Jones vector of the test signal after passing through the Raman amplified system in operation 101, may be reconstructed.

In operation 101, the Jones vector is converted into a Stokes vector. In at least one embodiment, the Jones vector $[E_x, E_y]^T$ may be converted into a corresponding Stokes vector $[S_1, S_2, S_3]^T$, then in the Stokes space, an average vector $[\langle S_1 \rangle, \langle S_2 \rangle, \langle S_3 \rangle]^T$ of the Stokes vector $[S_1, S_2, S_3]^T$ is calculated, thereafter, rotation of the Stokes space is performed to convert $\langle S_2 \rangle$ and $\langle S_3 \rangle$ of the average vector $[\langle S_1 \rangle, \langle S_2 \rangle, \langle S_3 \rangle]^T$ into 0 to obtain a new Stokes vector $[S'_1, S'_2, S'_3]^T$, and finally, an optical intensity $S'_0 = \sqrt{|S'_1|^2+|S'_2|^2+|S'_3|^2}$ is obtained according to the new Stokes vector $[S'_1, S'_2, S'_3]^T$.

The foregoing only exemplifies a method for converting the Jones vector into the Stokes vector; however, this disclosure is not limited thereto, and the Jones vector may also be converted into the Stokes vector in other methods. And as different impairments in the Raman amplified system have different characteristics on the Stokes vector, by converting the Jones vector of a test signal carrying various impairments (i.e. the test signals passing through the Raman amplified system) into the Stokes vector, these impairments may be distinguished.

In the embodiment of this disclosure, the transmission impairments may include: a time-varying gain fluctuation, influence of cross polarization modulation on a polarization state of a signal, influence of cross phase modulation on a phase of a signal, and a dual-polarization ASE noise, etc. However, this disclosure is not limited thereto, and depending on different structures of optical transmission systems, the transmission impairments may further include more or fewer impairment types, and in this disclosure, description is given by taking that transmission impairments to which the test signal is subjected are the above four types of transmission impairments as an example.

In the embodiment of this disclosure, the transmission impairment decomposition model is pre-established, and different impairments in the Raman amplified system are described by the model.

In at least one embodiment, the transmission impairment decomposition model is as shown below.

$$\begin{bmatrix} E_{x,in} \\ E_{y,in} \end{bmatrix} \rightarrow \begin{bmatrix} G+\Delta & 0 \\ 0 & G+\Delta \end{bmatrix} \rightarrow \begin{bmatrix} \cos(\delta/2) & -j\sin(\delta/2) \\ -j\sin(\delta/2) & \cos(\delta/2) \end{bmatrix} \rightarrow$$
$$\text{Input signal} \quad \text{Gain fluctuation} \quad \text{45deg Retarder}$$

$$\begin{bmatrix} \cos(\theta) & -\sin(\theta) \\ \sin(\theta) & \cos(\theta) \end{bmatrix} \rightarrow \begin{bmatrix} e^{j\varphi_{xpm}} & 0 \\ 0 & e^{j\varphi_{xpm}} \end{bmatrix} \rightarrow \begin{matrix} + \\ \uparrow \\ \begin{bmatrix} n_x \\ n_y \end{bmatrix} \end{matrix} \rightarrow \begin{bmatrix} E_{x,out} \\ E_{y,out} \end{bmatrix};$$
$$\text{Rotator} \quad \text{Phase noise} \quad \text{ASE noise} \quad \text{Output signal}$$

where, $[E_{x,in}, E_{y,in}]^T$ is a Jones vector of an optical signal before passing through the E where, r Raman amplified system, G is a Raman gain, which is a constant, $\Delta$ is a time-varying gain fluctuation, a mean value of which being 0, 45 deg Retarder is influence of cross polarization modulation on a polarization state of an optical signal in an $S_3$ direction, $\delta/2$ is phase delay between two polarization states of the optical signal, a mean value of which being 0 and time-varying, Rotator is influence of cross polarization modulation on a polarization state of an optical signal in an $S_2$ direction, $\theta$ is rotation angle of polarization rotation of an optical signal, a mean value of which being 0 and time-varying, Phase noise is influence of cross phase modulation on a phase of the optical signal, $\varphi_{xpm}$ is a phase noise, a mean value of which being 0 and time-varying, $[n_x, n_y]^T$ is a dual-polarization ASE noise, $n_x$ and $n_y$ being independent-identically-distributed, mean values of which being 0 and time-varying, and $[E_{x,out}, E_{y,out}]^T$ is a Jones vector of the optical signal after passing through the Raman amplified system.

The above transmission impairment decomposition model is an example only, and the transmission impairment decomposition model may, for example, also increase types of some transmission impairments or reduce types of some transmission impairments. For example, the phase noise in the above transmission impairment decomposition model may be optional.

In operation 102, various transmission impairments to which the test signal is subjected may be obtained by decomposing the above Stokes vector of the test signal according to the above transmission impairment decomposition model.

For example, in operation 102, the Raman gain G, the power $\langle P_{ASE,BW=2f_{3dB,Rx}} \rangle$ and random sample $[n'_x, n'_y]^T$ of the ASE noise, and the variance $\langle \Delta^2 \rangle$ and random sample $n''_\Delta$ of the above gain fluctuation may be estimated according to the spectrum of the optical intensity $S'_0$.

Figure 3:
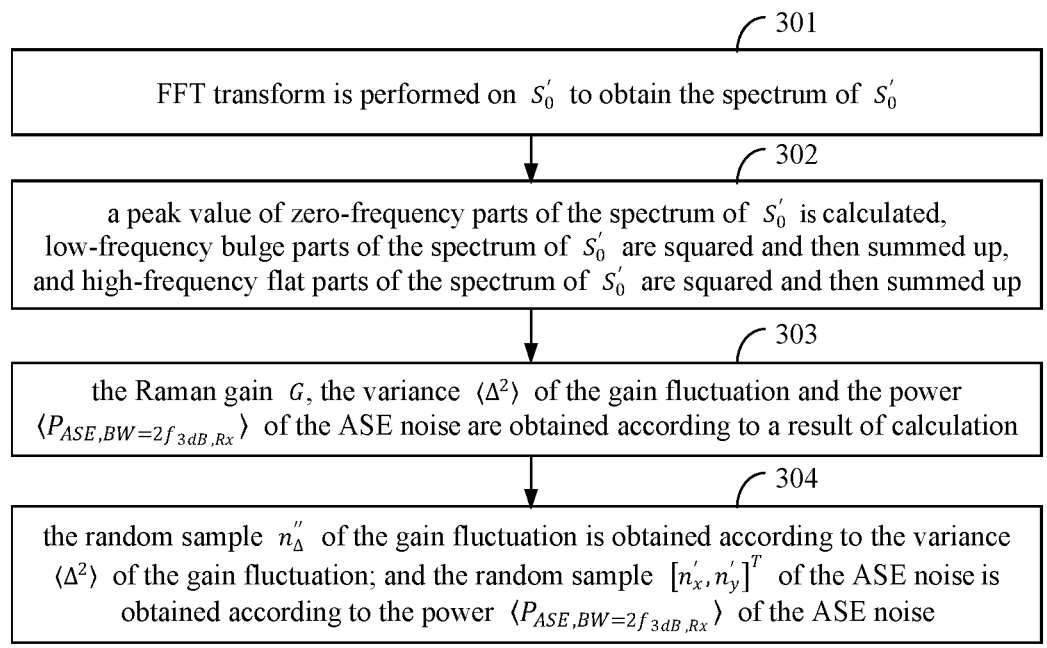
FIG. 3 is a schematic diagram of a method for estimating a Raman gain G, power $\langle P_{ASE,BW=2f_{3dB,Rx}} \rangle$ and a random sample $[n'_x, n'_y]^T$ of an ASE noise, and variance $\langle \Delta^2 \rangle$ and a random sample $n''_\Delta$ of a gain fluctuation.

FIG. 3 is a schematic diagram of a method for estimating the power of the ASE noise and the variance $\langle \Delta^2 \rangle$ and random sample $n''_\Delta$ of the gain fluctuation according to the spectrum of $S'_0$. As shown in FIG. 3, the method includes:

operation 301: FFT transform is performed on $S'_0$ to obtain the spectrum of $S'_0$;

operation 302: a peak value of zero-frequency parts of the spectrum of $S'_0$ is calculated, low-frequency bulge parts of the spectrum of $S'_0$ are squared and then summed up, and high-frequency flat parts of the spectrum of $S'_0$ are squared and then summed up;

operation 303: the Raman gain G, the variance $\langle \Delta^2 \rangle$ of the gain fluctuation and the power $\langle P_{ASE,BW=2f_{3dB,Rx}} \rangle$ of the ASE noise are obtained according to a result of the calculation; and operation 304: the random sample $n'_\Delta$ of the gain fluctuation is obtained according to the variance $\langle \Delta^2 \rangle$ of the gain fluctuation; and the random sample $[n'_x, n'_y]^T$ of the ASE noise is obtained according to the power $\langle P_{ASE,BW=2f_{3dB,Rx}} \rangle$ of the ASE noise.

Figure 4:
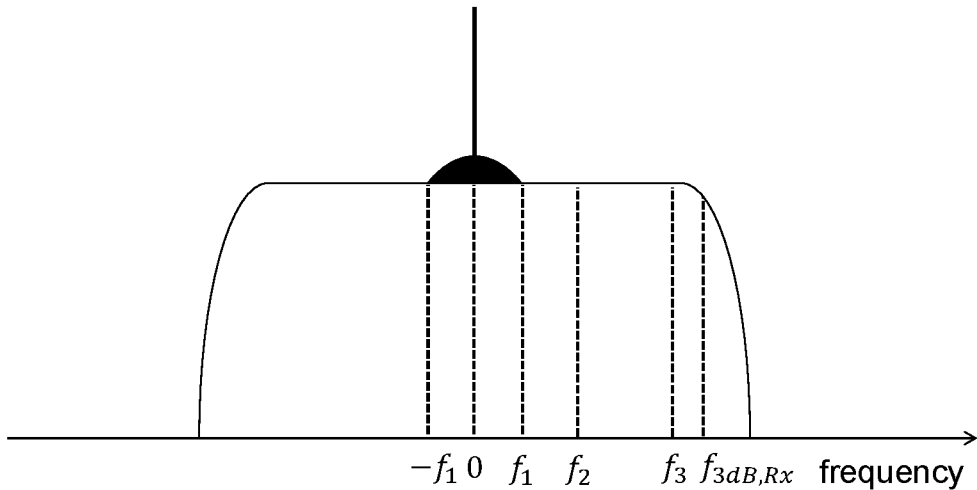
FIG. 4 is a schematic diagram of a spectrum of $S'_0$.

FIG. 4 is a schematic diagram of the spectrum of $S'_0$. As shown in FIG. 4, the peak of the zero-frequency parts of the spectrum is the mean value of $S'_0$, which may be expressed as:

$$\langle S'_0 \rangle = \tag{1}$$
$$G^2 + \langle \Delta^2 \rangle + \langle |n_x|^2 \rangle + \langle |n_y|^2 \rangle \approx G^2 + \langle \Delta^2 \rangle + \langle P_{ASE,BW=2f_1} \rangle \cdot \frac{2f_{3dB,Rx}}{2f_1}.$$

As the gain fluctuation has a characteristic of low pass and the optical ASE noise covers an entire bandwidth of a receiver, when an optical signal-to-noise ratio is relatively large and the gain fluctuation is relatively small, the spectrum of $S'_0$ is mainly $2G\Delta$ and $2GRe(n_x)$ at the low-frequency bulge parts. The low-frequency bulge parts (excluding a peak of a zero frequency) are squared and then summed up, which may be expressed as:

$$4G^2\langle\Delta^2\rangle + G^2\langle P_{ASE,BW=2f_1}\rangle = \Sigma_{-f_1}^{f_1}[|fft(S'_0)|^2] - \langle S'_0\rangle^2 \tag{2}$$

The spectrum of $S'_0$ is mainly $2GRe(n_x)$ at the high-frequency flat parts, and the high-frequency flat parts (from $f_2$ to $f_3$) are squared and then summed up, which may be expressed as:

$$G^2\langle P_{ASE,BW=2f_{3dB,Rx}}\rangle \cdot \frac{2f_1}{2f_{3dB,Rx}} = \tag{3}$$

$$G^2\langle P_{ASE,BW=2f_1}\rangle = \sum_{f_2}^{f_3}[|fft(S'_0)|^2]\frac{2f_1}{f_3-f_2}.$$

The Raman gain G, the variance $\langle \Delta^2 \rangle$ of the gain fluctuation and the power $\langle P_{ASE,BW=2f_{3dB,Rx}} \rangle$ of the ASE noise may be obtained by combining formulae (1), (2) and (3).

Thereafter, the low-frequency bulge parts (excluding the peak of zero frequency) are extracted as filters to filter a Gaussian white noise $n_\Delta$ to obtain a colored noise $n'_\Delta$. Power of the colored noise is locked to the variance $\langle \Delta^2 \rangle$ of the gain fluctuation, and an appropriate random sample $n''_\Delta$ of the gain fluctuation $\Delta$ may be obtained.

Similar to the above, by locking the power of the dual-polarization complex Gaussian white noise $[n_x, n_y]^T$ to the power $\langle P_{ASE,BW=2f_{3dB,Rx}} \rangle$ of the ASE noise, an appropriate random sample $[n'_x, n'_y]^T$ of the ASE noise may be obtained.

With the method above, the power $\langle P_{ASE,BW=2f_{3dB,Rx}} \rangle$ and the random sample $[n_x', n_y']^T$ of the above ASE noise and the variance $\langle \Delta^2 \rangle$ and the random sample $n''_\Delta$ of the above gain fluctuation may be obtained, thereby obtaining characteristics of the G, $\Delta$ and ASE noise in the above transmission impairment decomposition model.

For another example, in operation 102, the variance $\langle (n'''_\theta)^2 \rangle$ and the random sample $n'''_\theta$ of the polarization rotation $\theta$ may be estimated according to the spectrum and autocorrelation value of above $S'_2$.

Figure 5:
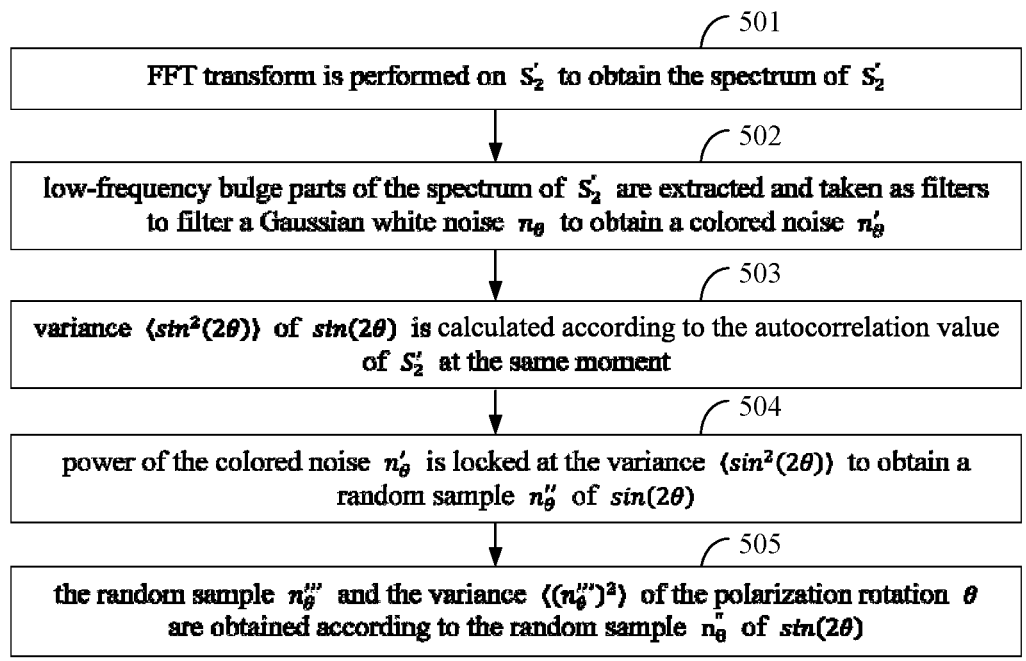
FIG. 5 is a schematic diagram of a method for estimating variance $\langle (n'''_\theta)^2 \rangle$ and a random sample $n'''_\theta$ of polarization rotation $\theta$.

FIG. 5 is a schematic diagram of a method for estimating the variance $\langle (n'''_\theta)^2 \rangle$ and the random sample $n'''_\theta$ of the polarization rotation $\theta$ according to the spectrum and autocorrelation value of $S'_2$. As shown in FIG. 5, the method includes:

operation 501: FFT transform is performed on $S'_2$ to obtain the spectrum of $S'_2$;

operation 502: low-frequency bulge parts of the spectrum of $S'_2$ are extracted and taken as filters to filter a Gaussian white noise $n_\theta$ to obtain a colored noise $n'_\theta$;

operation 503: variance $\langle \sin^2(2\theta) \rangle$ of $\sin(2\theta)$ is calculated according to the autocorrelation value of $S'_2$ at the same moment;

operation 504: power of the colored noise $n'_\theta$ is locked at the variance $\langle \sin^2(2\theta) \rangle$ to obtain a random sample $n''_\theta$; of $\sin(2\theta)$; and operation 505: the random sample $n'''_\theta$ and the variance $\langle (n'''_\theta)^2 \rangle$ of the polarization rotation $\theta$ are obtained according to the random sample $n''_\theta$ of $\sin(2\theta)$.

Figure 6:
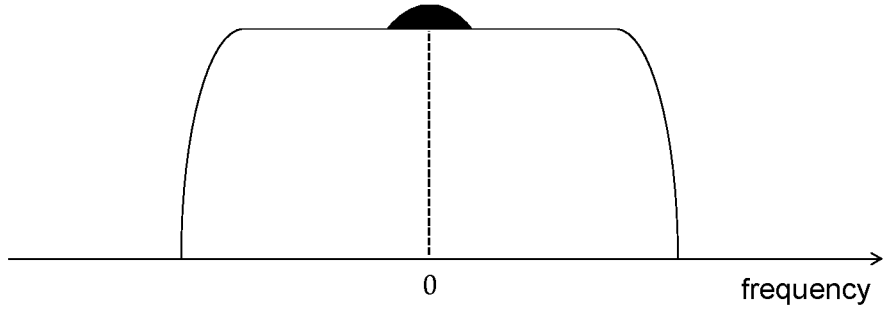
FIG. 6 is a schematic diagram of a spectrum of $S'_2$.

FIG. 6 is a schematic diagram of the spectrum of $S'_2$. As shown in FIG. 6, the bulge parts at the low frequency are influences of Raman amplification on the polarization state of the optical signal in an $S_2$ direction. The bulge parts are extracted and taken as filters to filter the Gaussian white noise $n_\theta$ to obtain a colored noise $n'_\theta$.

Then the variance of $\sin(2\theta)$ is calculated according to the autocorrelation value of $S'_2$ at the same moment, which may be expressed as:

$$\langle \sin^2(2\theta) \rangle \approx \frac{R_{S'_2}(0)\frac{1}{2}\left(\langle P_{ASE,BW=2f_1}\rangle \cdot \frac{2f_{3dB,Rx}}{2f1}\right)^2 - (G^2 + \langle \Delta^2 \rangle)(P_{ASE,BW=2f_1})\cdot \frac{2f_{3dB,Rx}}{2f1}}{G^4 + 6G^2\langle \Delta^2 \rangle}. \tag{4}$$

Thereafter, the power of the colored noise $n'_\theta$ is locked to $\langle \sin^2(2\theta) \rangle$, and the random sample $n''_\theta$ of $\sin(2\theta)$ may be obtained, and hence, the random sample $n'''_\theta$ and the variance $\langle (n'''_\theta)^2 \rangle$ of $\theta$ may be obtained.

With the method above, the variance $\langle (n'''_\theta)^2 \rangle$ and the random sample $n'''_\theta$ of the polarization rotation $\theta$ may be obtained, thereby obtaining characteristics of the rotator in the above transmission impairment decomposition model.

For another example, in operation 102, the variance $\langle(n'''_\delta)^2\rangle$ and the random sample $n'''_{\delta/2}$ of the phase delay $\delta/2$ may be estimated according to the spectrum and autocorrelation value of above $S'_3$.

Figure 7:
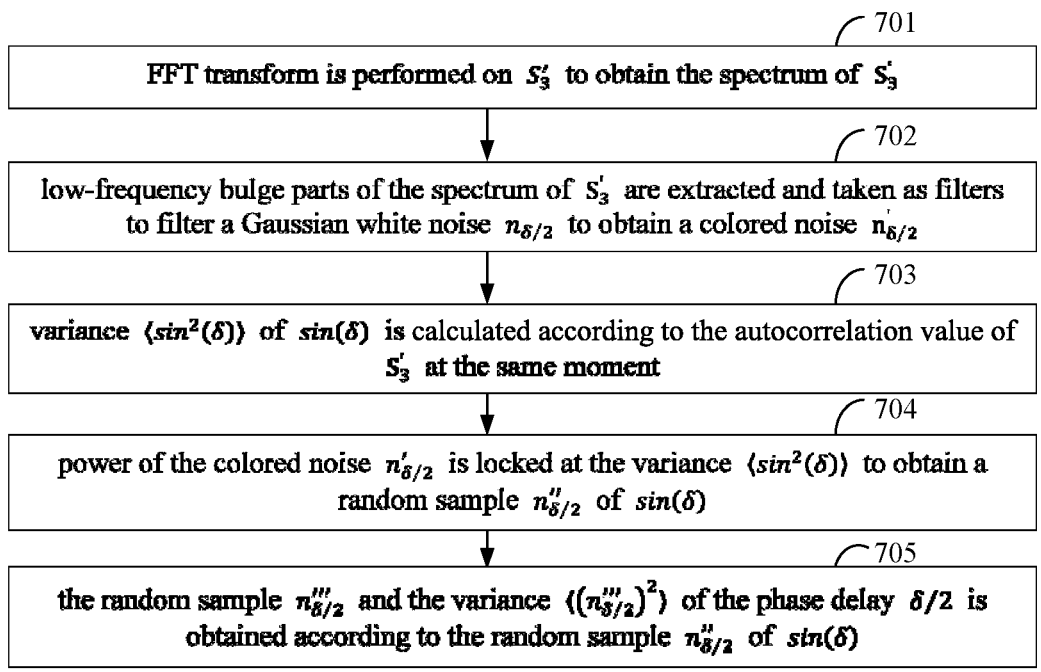
FIG. 7 is a schematic diagram of a method for estimating variance $\langle (n'''_{\delta/2})^2 \rangle$ and a random sample $n'''_{\delta/2}$ of phase delay $\delta/2$.

FIG. 7 is a schematic diagram of a method for estimating the variance $\langle(n'''_{\delta/2})^2\rangle$ and the random sample $n'''_{\delta/2}$ of the phase delay $\delta/2$ according to the spectrum and autocorrelation value of $S'_3$. As shown in FIG. 7, the method includes:

operation 701: FFT transform is performed on $S'_3$ to obtain the spectrum of $S'_3$;

operation 702: low-frequency bulge parts of the spectrum of $S'_3$ are extracted and taken as filters to filter a Gaussian white noise $n_{\delta/2}$ to obtain a colored noise $n'_{\delta/2}$;

operation 703: variance $\langle\sin^2(\delta)\rangle$ of $\sin(\delta)$ is calculated according to the autocorrelation value of $S'_3$ at the same moment;

operation 704: power of the colored noise $n'_{\delta/2}$ is locked at the variance $\langle\sin^2(\delta)\rangle$ to obtain a random sample $n''_{\delta/2}$ of $\sin(\delta)$; and operation 705: the random sample $n'''_{\delta/2}$ and the variance $\langle(n'''_{\delta/2})^2\rangle$ of the phase delay $\delta/2$ is obtained according to the random sample $n''_{\delta/2}$ of $\sin(\delta)$.

The spectrum of $S'_3$ is similar to that of $S'_2$. Referring to FIG. 6, the low-frequency bulge parts are influence of Raman amplification on the polarization state of the optical signal in the $S_3$ direction. The bulge parts are extracted and taken as filters to filter a Gaussian white noise $n_{\delta/2}$ to obtain a colored noise $n'_{\delta/2}$.

Then the variance of $\sin(\delta)$ is calculated according to the autocorrelation value of $S'_3$ at the same moment, which may be expressed as:

$$\langle\sin^2(\delta)\rangle \approx \frac{R_{S'_3}(0) - \frac{1}{2}\left(\langle P_{ASE,BW=2f1}\rangle \cdot \frac{2f_{3dB,Rx}}{2f1}\right)^2 - (G^2 + \langle\Delta^2\rangle)(P_{ASE,BW=2f1}) \cdot \frac{2f_{3dB,Rx}}{2f1}}{G^4 + 6G^2\langle\Delta^2\rangle}. \quad (5)$$

Thereafter, the power of the colored noise $n'_{\delta/2}$ is locked to $\langle\sin^2(\delta)\rangle$, and a random sample $n''_{\delta/2}$ of one $\sin(\delta)$ may be obtained, and hence, the random sample $n''''_{\delta/2}$ and the variance $\langle(n''''_{\delta/2})^2\rangle$ of $\delta/2$ may be obtained.

With the method above, the variance $\langle(n'''_{\delta/2})^2\rangle$ and the random sample $n'''_{\delta/2}$ of the phase delay $\delta/2$ may be obtained, thereby obtaining characteristics of the 45 deg retarder in the above transmission impairment decomposition model.

For another example, in operation 102, the variance $\langle(n'''\theta_{\varphi xpm})_2\rangle$ and the random sample $n'''_{\varphi xpm}$ of the phase noise $\varphi_{xpm}$ may be estimated according to the phase noise $\varphi_{xpm}$ and the phase delay $\delta/2$. In this example, the variance $\langle(n'''_{\varphi xpm})\rangle$ and the random sample $n'''_{\varphi xpm}$ of the phase noise $\varphi_{xpm}$ may be estimated by using a characteristic of independent-identical-distribution of the phase noise $\varphi_{xpm}$ and the phase delay $\delta/2$.

For example, the 45 deg retarder (i.e. a phase retarder of an azimuth of 45 degrees) in the above transmission impairment decomposition model may be decomposed first, and formula (6) may be obtained as follows:

$$\begin{bmatrix} \cos(\delta/2) & -j\sin(\delta/2) \\ -j\sin(\delta/2) & \cos(\delta/2) \end{bmatrix} = \begin{bmatrix} \cos(\frac{\pi}{4}) & -\sin(\frac{\pi}{4}) \\ \sin(\frac{\pi}{4}) & \cos(\frac{\pi}{4}) \end{bmatrix}$$

$$\begin{bmatrix} e^{-j\frac{\delta}{2}} & 0 \\ 0 & e^{j\frac{\delta}{2}} \end{bmatrix} \begin{bmatrix} \cos(\frac{\pi}{4}) & \sin(\frac{\pi}{4}) \\ -\sin(\frac{\pi}{4}) & \cos(\frac{\pi}{4}) \end{bmatrix}$$

And then the signal phase may be directly decomposed, and formula (7) may be obtained as follows:

$$\begin{bmatrix} e^{j\varphi_x} & 0 \\ 0 & e^{j\varphi_y} \end{bmatrix} = \begin{bmatrix} e^{j\frac{\varphi_x-\varphi_y}{2}} & 0 \\ 0 & e^{j\frac{\varphi_y-\varphi_x}{2}} \end{bmatrix} \begin{bmatrix} e^{j\frac{\varphi_x-\varphi_y}{2}} & 0 \\ 0 & e^{j\frac{\varphi_x-\varphi_y}{2}} \end{bmatrix} =$$

$$\begin{bmatrix} e^{-j\frac{\delta}{2}} & 0 \\ 0 & e^{j\frac{\delta}{2}} \end{bmatrix} \begin{bmatrix} e^{j\varphi_{xpm}} & 0 \\ 0 & e^{j\varphi_{xpm}} \end{bmatrix}$$

In formulae (6) and (7), $\delta/2$ is both equal to $(\varphi_y-\varphi_x)/2$, and in formula (7), $\varphi_{xpm}=(\varphi_x+\varphi_y)/2$. As $\varphi_x$ and $\varphi_y$ are independent, the random sample $n'''_{\varphi xpm}$ and the variance $\langle(n'''_{\varphi xpm})\rangle$ of the phase noise $\varphi_{xpm}$ may be obtained in the method for obtaining the random sample and the variance of the phase delay $\delta/2$, which shall not be described herein any further.

With the method above, a characteristic of the phase noise in the above transmission impairment decomposition model may be obtained.

In the embodiment of this disclosure, by substituting the above estimated values of various transmission impairments into the above pre-established transmission impairment decomposition model, a complete transmission impairment decomposition model used for transmission impairment estimation may be obtained.

How to estimate the various transmission impairments to which the test signal is subjected by using the Stokes vector of the test signal according to the pre-established transmission impairment decomposition model has been described above by way of examples. However, this disclosure is not limited thereto, and the various transmission impairments to which the test signal is subjected may also be estimated by using the Stokes vector of the test in other manners.

Performing impairment estimation according to the complete transmission impairment decomposition model established in the embodiment of this disclosure is beneficial to analysis of various transmission impairments passing through the Raman amplified system, and thus is beneficial to improvement of the system.

A Second Aspect of the Embodiments

The second aspect of the embodiments of this disclosure provides a method for estimating a bit error penalty of a Raman amplified system. This method uses the complete transmission impairment decomposition model established in the method of the first aspect of the embodiments to estimate bit error penalties introduced into an optical signal by total impairments and single impairments in a Raman amplified system, and a particular method for estimation the bit error penalties is not limited in this disclosure. Therefore, primary and the secondary impairments in the Raman amplified system may be determined according to a magnitude of the bit error penalty introduced into the optical signal by the single impairments.

A Third Aspect of the Embodiments

The third aspect of the embodiments of this disclosure provides an apparatus for establishing a transmission impairment decomposition model for a Raman amplified system. As principles of the apparatus for solving problems are similar to that of the method of the first aspect of the embodiments, reference may be made to the implementation of the method of the first aspect of the embodiments for implementation of this apparatus, with identical contents being not going to be described herein any further.

Figure 8:
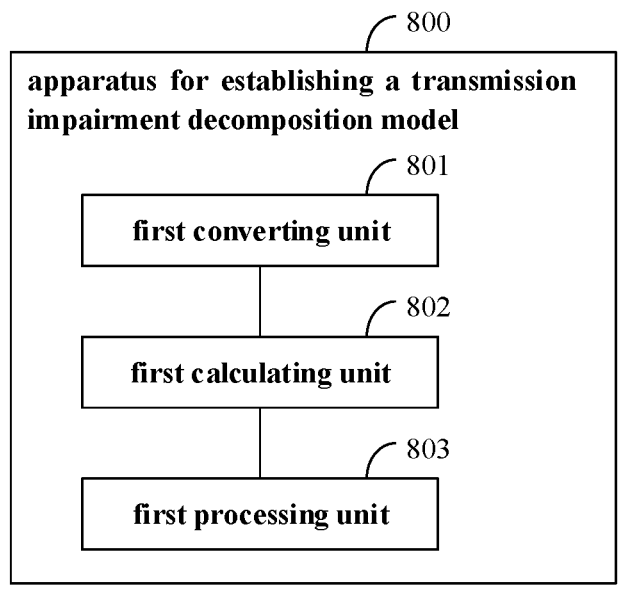
FIG. 8 is a schematic diagram of the apparatus for establishing a transmission impairment decomposition model of an embodiment of this disclosure.

FIG. 8 is a schematic diagram of an apparatus 800 for establishing a transmission impairment decomposition model of the embodiment of this disclosure. As shown in FIG. 8, the apparatus 800 for establishing a transmission impairment decomposition model includes a first converting unit 801, a first calculating unit 802 and a first processing unit 803. The first converting unit 801 is configured to convert a Jones vector of a test signal after passing through a Raman amplified system into a Stokes vector; the first calculating unit 802 is configured to calculate transmission impairments to which the test signal is subjected by using the Stokes vector according to a pre-established transmission impairment decomposition model; and the first processing unit 803 is configured to substitute values of the transmission impairments into the pre-established transmission impairment decomposition model to obtain a complete transmission impairment decomposition model used for estimating transmission impairments.

Figure 9:
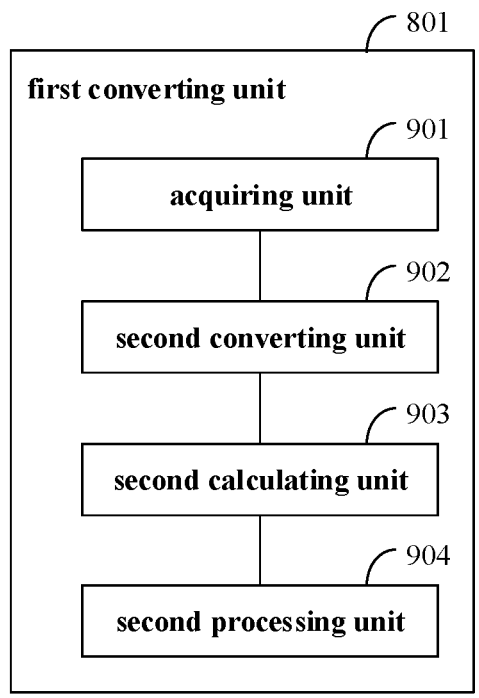
FIG. 9 is a schematic diagram of the first converting unit of the apparatus for establishing a transmission impairment decomposition model shown in FIG. 8.

FIG. 9 is a schematic diagram of the first converting unit 801 of the apparatus 800 for establishing a transmission impairment decomposition. As shown in FIG. 9, the first converting unit 801 may include: an acquiring unit 901, a second converting unit 902, a second calculating unit 903 and a second processing unit 904. The acquiring unit 901 is configured to acquire the test signal after passing through the Raman amplified system to reconstruct the Jones vector of the test signal as $[E_x, E_y]^T$; the second converting unit 902 is configured to convert the Jones vector $[E_x, E_y]^T$ into a corresponding Stokes vector $[S_1, S_2, S_3]^T$; the second calculating unit 903 is configured to calculate a mean vector $[\langle S_1 \rangle, \langle S_2 \rangle, \langle S_3 \rangle]^T$ of the Stokes vector $[S_1, S_2, S_3]^T$ in a Stokes space; and the second processing unit 904 is configured to perform Stokes space rotation, convert $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtain an optical intensity $S'_0 = \sqrt{|S'_1|^2 + |S'_2|^2 + |S'_3|^2}$ according to the new Stokes vector $[S'_1, S'_2, S'_3]^T$.

In the embodiment of this disclosure, the transmission impairments include at least one of the following: a time-varying gain fluctuation, influence of cross polarization modulation on a polarization state of a signal, influence of cross phase modulation on a phase of a signal, and a dual-polarization ASE noise; however, this disclosure is not limited thereto.

In at least one embodiment, the pre-established transmission impairment decomposition model is as follows:

$$\begin{bmatrix} E_{x,in} \\ E_{y,in} \end{bmatrix}_{\text{Input signal}} \rightarrow \begin{bmatrix} G+\Delta & 0 \\ 0 & G+\Delta \end{bmatrix}_{\text{Gain fluctuation}} \rightarrow \begin{bmatrix} \cos(\delta/2) & -j\sin(\delta/2) \\ -j\sin(\delta/2) & \cos(\delta/2) \end{bmatrix}_{\text{45deg Retarder}} \rightarrow$$

$$\begin{bmatrix} \cos(\theta) & -\sin(\theta) \\ \sin(\theta) & \cos(\theta) \end{bmatrix}_{\text{Rotator}} \rightarrow \begin{bmatrix} e^{j\varphi_{xpm}} & 0 \\ 0 & e^{j\varphi_{xpm}} \end{bmatrix}_{\text{Phase noise}} \rightarrow \underset{\begin{bmatrix} n_x \\ n_y \end{bmatrix}_{\text{ASE noise}}}{+} \rightarrow \begin{bmatrix} E_{x,out} \\ E_{y,out} \end{bmatrix}_{\text{Output signal}};$$

where, $[E_{x,in}, E_{y,in}]^T$ is a Jones vector of an optical signal before passing through the E; where, Raman amplified system, G is a Raman gain, A is a time-varying gain fluctuation, 45 deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_y]^T$ is a dual-polarization ASE noise, and $[E_{x,out}, E_{y,out}]^T$ is a Jones vector of the optical signal after passing through the Raman amplified system.

In at least one embodiment, the first calculating unit 802 may estimate the Raman gain G, power $\langle P_{ASE,BW=2f_{3dB,Rx}} \rangle$ and a random sample $[n'_x, n'_y]^T$ of the ASE noise, and variance $\langle \Delta^2 \rangle$ and a random sample $n''_\Delta$ of the gain fluctuation, according to a spectrum of $S'_0$, for example, the first calculating unit 802 may, perform FFT transform on $S'_0$; to obtain the spectrum of $S'_0$;

calculate a peak value of zero-frequency parts of the spectrum of $S'_0$, square low-frequency bulge parts of the spectrum of $S'_0$; and then sum them up, and square high-frequency flat parts of the spectrum of $S'_0$; and then sum them up;

obtain the Raman gain G, the variance $\langle \Delta^2 \rangle$ of the gain fluctuation and the power $\langle P_{ASE,BW=2f_{3dB,Rx}} \rangle$ of the ASE noise according to a result of calculation;

obtain the random sample $n''_\Delta$ of the gain fluctuation according to the variance $\langle \Delta^2 \rangle$ of the gain fluctuation, and obtain the random sample $[n'_x, n'_y]^T$ of the ASE noise according to the power of the ASE noise.

In at least one embodiment, the first calculating unit 802 may estimate variance $\langle (n'''_\theta)^2 \rangle$ and a random sample $n'''_\theta$ of polarization rotation $\theta$ according to a spectrum and a auto-correlation value of $S'_2$, for example, the first calculating unit 802 may, perform FFT transform on $S'_2$ to obtain the spectrum of $S'_2$;

extract low-frequency bulge parts of the spectrum of $S'_2$ and take them as filters to filter a Gaussian white noise $n_\theta$ to obtain a colored noise $n'_\theta$;

calculate variance $\langle \sin^2(2\theta) \rangle$ of $\sin(2\theta)$ according to the autocorrelation value of $S'_2$ at the same moment;

lock power of the colored noise $n'_\theta$ at the variance $\langle \sin^2(2\theta) \rangle$ to obtain a random sample $n''_\theta$ of $\sin(2\theta)$; and obtain the random sample $n'''_\theta$ and the variance $\langle (n'''_\theta)^2 \rangle$ of the polarization rotation $\theta$ according to the random sample $n''_\theta$ of $\sin(2\theta)$.

In at least one embodiment, the first calculating unit 802 may estimate variance $\langle (n'''_{\delta/2})^2 \rangle$ and a random sample $n'''_{\delta/2}$ of phase delay $\delta/2$ according to a spectrum and a autocorrelation value of $S'_3$, for example, the first calculating unit 802 may, perform FFT transform on $S'_3$ to obtain the spectrum of $S'_3$;

extract low-frequency bulge parts of the spectrum of $S'_3$ and take them as filters to filter a Gaussian white noise $n_{\delta/2}$ to obtain a colored noise $n'_{\delta/2}$;

calculate variance $\langle\sin^2(\delta)\rangle$ of $\sin(\delta)$ according to the autocorrelation value of $S'_3$ at the same moment;

lock power of the colored noise $n'_{\delta/2}$ at the variance $\langle\sin^2(\delta)\rangle$ to obtain a random sample $n''_{\delta/2}$ of $\sin(\delta)$; and obtain the random sample $n'''_{\delta/2}$ and the variance $\langle(n'''_{\delta/2})^2\rangle$ of the phase delay $\delta/2$ according to the random sample $n''_{\delta/2}$ of $\sin(\delta)$.

In at least one embodiment, the first calculating unit 802 may estimate variance $\langle(n'''_{\varphi xpm})^2\rangle$ and a random sample $n'''_{\varphi xpm}$ of a phase noise $\varphi_{xpm}$ according to the phase noise $\varphi_{xpm}$ and the phase delay $\delta/2$.

In the embodiment of this disclosure, the apparatus 800 for establishing a transmission impairment decomposition model may be implemented by a processor and a memory.

For example, in an embodiment, a function of the apparatus 800 for establishing a transmission impairment decomposition model may be integrated into a processor, and the processor executes the function of the apparatus 800 for establishing a transmission impairment decomposition model; wherein the function of the apparatus 800 for establishing a transmission impairment decomposition model is incorporated herein, which shall not be described herein any further.

For another example, in another embodiment, the apparatus 800 for establishing a transmission impairment decomposition model may be configured separately from the processor. For example, the apparatus 800 for establishing a transmission impairment decomposition model may be configured as a chip connected to the processor, and the function of the apparatus 800 for establishing a transmission impairment decomposition model is achieved under control of the processor.

In this embodiment, the memory may be, for example, one or more of a buffer, a flash memory, a hard drive, a removable medium, a volatile memory, a non-volatile memory, or other suitable devices. Various data may be stored, and furthermore, a program for information processing may also be stored.

In this embodiment, the processor is sometimes referred to as a controller or an operating control, and may include a microprocessor or other processor devices and/or logic devices. The processor receives input and controls operations of various components of a receiver, and the processor may execute a program stored in the memory to implement information storage or processing, etc.

The apparatus for establishing a transmission impairment decomposition model in the embodiment of this disclosure may be configured in a receiver, or may be configured independent of the receiver, and this disclosure is not limited thereto.

Performing impairment estimation according to the complete transmission impairment decomposition model established in the embodiment of this disclosure is beneficial to analysis of various transmission impairments passing through the Raman amplified system, and thus is beneficial to improvement of the system.

A Fourth Aspect of the Embodiments

Figure 10:
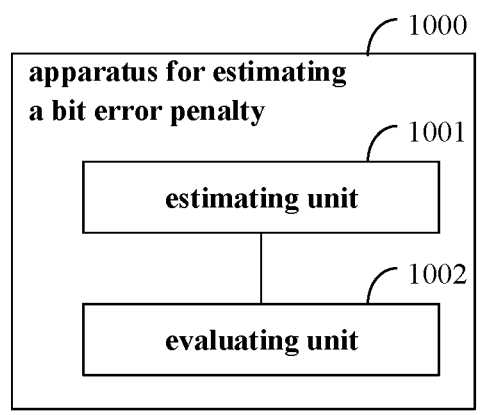
FIG. 10 is a schematic diagram of the apparatus for estimating a bit error penalty of an embodiment of this disclosure.

The fourth aspect of the embodiments of this disclosure provides an apparatus for estimating a bit error penalty of a Raman amplified system. FIG. 10 is a schematic diagram of the apparatus for estimating a bit error penalty of a Raman amplified system. As shown in FIG. 10, an apparatus 1000 for estimating a bit error penalty includes an estimating unit 1001 and an evaluating unit 1002. The estimating unit 1001 is configured to, by using the complete transmission impairment decomposition model established by the apparatus in the third aspect of the embodiments, estimate a bit error penalty introduced into optical signals by total impairments and single impairments in a Raman amplified system, and the evaluating unit 1002 is configured to determine primary impairments and secondary impairments in the Raman amplified system according to a magnitude of the bit error penalty introduced by the single impairments.

In the embodiment of this disclosure, the apparatus 1000 for estimating a bit error penalty may be implemented by a processor and a memory.

For example, in an embodiment, a function of the apparatus 1000 for estimating a bit error penalty may be integrated into a processor, and the processor executes the function of the apparatus 1000 for estimating a bit error penalty; wherein the function of the apparatus 1000 for estimating a bit error penalty is incorporated herein, which shall not be described herein any further.

For another example, in another embodiment, the apparatus 1000 for estimating a bit error penalty may be configured separately from the processor. For example, the apparatus 1000 for estimating a bit error penalty may be configured as a chip connected to the processor, and the function of the apparatus 1000 for estimating a bit error penalty is achieved under control of the processor.

In this embodiment, the memory may be, for example, one or more of a buffer, a flash memory, a hard drive, a removable medium, a volatile memory, a non-volatile memory, or other suitable devices. Various data may be stored, and furthermore, a program for information processing may also be stored.

In this embodiment, the processor is sometimes referred to as a controller or an operating control, and may include a microprocessor or other processor devices and/or logic devices. The processor receives input and controls operations of various components of a receiver, and the processor may execute a program stored in the memory to implement information storage or processing, etc.

The apparatus for estimating a bit error penalty in the embodiment of this disclosure may be configured in a receiver, or may be configured independent of the receiver, and this disclosure is not limited thereto.

According to the apparatus of the embodiment of this disclosure, performing impairment estimation according to the complete transmission impairment decomposition model established by the apparatus in the third aspect of the embodiments is beneficial to analysis of various transmission impairments passing through the Raman amplified system, and thus is beneficial to improvement of the system.

A Fifth Aspect of the Embodiments

The fifth aspect of the embodiments of this disclosure provides an optical communications system.

In at least one embodiment, the optical communications system includes a transmitter, a Raman amplified system, a receiver and an apparatus for establishing a transmission impairment decomposition model. The apparatus for establishing a transmission impairment decomposition model is connected to the receiver or is configured in the receiver, and may be the apparatus 800 for establishing a transmission impairment decomposition model of the third aspect of the embodiments. As the composition and function of the apparatus 800 for establishing a transmission impairment decomposition model have been described in detail in the third aspect, the contents of which are incorporated herein, which shall not be described herein any further.

In at least one embodiment, the optical communications system includes a transmitter, a Raman amplified system, a receiver and an apparatus for estimating a bit error penalty. The apparatus for estimating a bit error penalty is connected to the receiver or is configured in the receiver, and may be the apparatus 1000 for estimating a bit error penalty of the fourth aspect of the embodiments. As the composition and function of the apparatus 1000 for estimating a bit error penalty have been described in detail in the fourth aspect, the contents of which are incorporated herein, which shall not be described herein any further.

In at least one embodiment, the optical communications system includes a transmitter, a Raman amplified system, a receiver, an apparatus for establishing a transmission impairment decomposition model and an apparatus for estimating a bit error penalty. The apparatus for establishing a transmission impairment decomposition model and the apparatus for estimating a bit error penalty are connected to the receiver or are configured in the receiver. The apparatus for establishing a transmission impairment decomposition model may be the apparatus 800 for establishing a transmission impairment decomposition model of the third aspect of the embodiments, and the apparatus for estimating a bit error penalty may be the apparatus 1000 for estimating a bit error penalty of the fourth aspect of the embodiments. As the compositions and functions of the apparatus 800 for establishing a transmission impairment decomposition model and the apparatus 1000 for estimating a bit error penalty have been described in detail in the third aspect and the fourth aspect, the contents of which are incorporated herein, which shall not be described herein any further.

In the embodiment of this disclosure, reference may be made to related techniques for conventional compositions and functions of the transmitter, the Raman amplified system and the receiver, which shall not be described herein any further.

An embodiment of the present disclosure provides a computer readable program, which, when executed in a Raman amplified system, will cause the Raman amplified system to carry out the method described in the first aspect or the second aspect of the embodiments.

An embodiment of the present disclosure provides a storage medium, including a computer readable program, which will cause a Raman amplified system to carry out the method described in the first aspect or the second aspect of the embodiments.

The above apparatuses and methods of the embodiments of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGs may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

According to the implementations of the embodiments of this disclosure, following supplements are further disclosed.

1. A method for establishing a transmission impairment decomposition model for a Raman amplified system, wherein the method includes:

S1: converting a Jones vector of a test signal after passing through a Raman amplified system into a Stokes vector;

S2: calculating transmission impairments to which the test signal is subjected by using the Stokes vector according to a pre-established transmission impairment decomposition model; and S3: substituting values of the transmission impairments into the pre-established transmission impairment decomposition model to obtain a complete transmission impairment decomposition model used for estimating transmission impairments.

2. The method according to supplement 1, wherein S1 includes:

acquiring the test signal after passing through the Raman amplified system to reconstruct the Jones vector of the test signal as $[E_x, E_y]^T$;

converting the Jones vector $[E_x, E_y]^T$ into a corresponding Stokes vector $[S_1, S_2, S_3]^T$ calculating a mean vector $[\langle S_1 \rangle, \langle S_2 \rangle, \langle S_3 \rangle]^T$ of the Stokes vector $[S_1, S_2, S_3]^T$ in a Stokes space; and performing Stokes space rotation, and converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$; and obtaining $S'_0 = \sqrt{|S'_1|^2 + |S'_2|^2 + |S'_3|^2}$ according to the new Stokes vector $[S'_1, S'_2, S'_3]^T$.

3. The method according to supplement 2, wherein the transmission impairments include at least one of the following: a time-varying gain fluctuation, influence of cross polarization modulation on a polarization state of a signal, influence of cross phase modulation on a phase of a signal, and a dual-polarization ASE noise.

4. The method according to supplement 3, wherein the pre-established transmission impairment decomposition model is as follows:

$$\underbrace{\begin{bmatrix} E_{x,in} \\ E_{y,in} \end{bmatrix}}_{\text{Input signal}} \rightarrow \underbrace{\begin{bmatrix} G+\Delta & 0 \\ 0 & G+\Delta \end{bmatrix}}_{\text{Gain fluctuation}} \rightarrow \underbrace{\begin{bmatrix} \cos(\delta/2) & -j\sin(\delta/2) \\ -j\sin(\delta/2) & \cos(\delta/2) \end{bmatrix}}_{45\text{deg Retarder}} \rightarrow$$

$$\underbrace{\begin{bmatrix} \cos(\theta) & -\sin(\theta) \\ \sin(\theta) & \cos(\theta) \end{bmatrix}}_{\text{Rotator}} \rightarrow \underbrace{\begin{bmatrix} e^{j\varphi_{xpm}} & 0 \\ 0 & e^{j\varphi_{xpm}} \end{bmatrix}}_{\text{Phase noise}} \rightarrow + \rightarrow \underbrace{\begin{bmatrix} E_{x,out} \\ E_{y,out} \end{bmatrix}}_{\text{Output signal}};$$
$$\underbrace{\begin{bmatrix} n_x \\ n_y \end{bmatrix}}_{\text{ASE noise}}$$

where, $[E_{x,in}, E_{y,in}]^T$ is a Jones vector of an optical signal before passing through the E where, r Raman amplified system, G is a Raman gain, A is a time-varying gain fluctuation, 45 deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_y]^T$ is a dual-polarization ASE noise, and $[E_{x,out}, E_{y,out}]^T$ is a Jones vector of the optical signal after passing through the Raman amplified system.

5. The method according to supplement 4, wherein S2 includes: estimating the Raman gain G, power $\langle P_{ASE,BW=2f_{3dB,Rx}} \rangle$ and a random sample $[n'_x, n'_y]^T$ and variance the ASE noise, variance $\langle \Delta^2 \rangle$ and a random sample $n''_\Delta$ of the gain fluctuation $\Delta$, according to a spectrum of $S'_0$ including:

performing FFT transform on $S'_0$ to obtain the spectrum of $S'_0$;

calculating a peak value of zero-frequency parts of the spectrum of $S'_0$, squaring low-frequency bulge parts of the spectrum of $S'_0$ and then summing them up, and squaring high-frequency flat parts of the spectrum of $S'_0$ and then summing them up;

obtaining the Raman gain G, the variance $\langle \Delta^2 \rangle$ of the gain fluctuation and the power $\langle P_{ASE,BW=2f_{3dB,Rx}} \rangle$ of the ASE noise according to a result of calculation;

obtaining the random sample $n''_\Delta$ of the gain fluctuation according to the variance $\langle \Delta^2 \rangle$ of the gain fluctuation; and obtaining the random sample $[n'_x, n'_y]^T$ of the ASE noise according to the power $\langle P_{ASE,BW=2f_{3dB,Rx}} \rangle$ of the ASE noise.

6. The method according to supplement 4, wherein S2 includes: estimating variance $\langle (n'''_\theta)^2 \rangle$ and a random sample of polarization rotation $\theta$ according to a spectrum and a autocorrelation value of $S'_2$, including:

performing FFT transform on $S'_2$ to obtain the spectrum of $S'_2$;

extracting low-frequency bulge parts of the spectrum of $S'_2$ and taking them as filters to filter a Gaussian white noise $n_\theta$ to obtain a colored noise $n'_\theta$;

calculating variance $\langle \sin^2(2\theta) \rangle$ of $\sin(2\theta)$ according to the autocorrelation value of $S'_2$ at the same moment;

locking power of the colored noise $n'_\theta$ at the variance $\langle \sin^2(2\theta) \rangle$ to obtain a random sample $n''_\theta$ of $\sin(2\theta)$; and obtaining the random sample $n'''_\theta$ and the variance $\langle (n'''_\theta)^2 \rangle$ of the polarization rotation $\theta$ according to the random sample $n''_\theta$ of $\sin(2\theta)$.

7. The method according to supplement 4, wherein S2 includes: estimating variance $\langle (n'''_{\delta/2})^2 \rangle$ and a random sample $n'''_{\delta/2}$ of phase delay $\delta/2$ according to a spectrum and a autocorrelation value of $S'_3$, including:

performing FFT transform on $S'_3$ to obtain the spectrum of $S'_3$;

extracting low-frequency bulge parts of the spectrum of $S'_3$ and taking them as filters to filter a Gaussian white noise $n_{\delta/2}$ to obtain a colored noise $n'_{\delta/2}$;

calculating variance $\langle \sin^2(\delta) \rangle$ of $\sin(\delta)$ according to the autocorrelation value of $S'_3$ at the same moment;

locking power of the colored noise $n'_{\delta/2}$ at the variance $\langle \sin^2(\delta) \rangle$ to obtain a random sample $n''_{\delta/2}$ of $\sin(\delta)$; and obtaining the random sample $n'''_{\delta/2}$ and the variance $\langle (n'''_{\delta/2})^2 \rangle$ of the phase delay $\delta/2$ according to the random sample $n''_{\delta/2}$ of $\sin(\delta)$.

8. The method according to supplement 4, wherein S2 includes: estimating variance $\langle (n'''_{\varphi xpm})^2 \rangle$ and a random sample $n'''_{\varphi xpm}$ of a phase noise $\varphi_{xpm}$ according to the phase noise $\varphi_{xpm}$ and the phase delay $\delta/2$.

9. A method for estimating a bit error penalty of a Raman amplified system, wherein the method includes:

by using a complete transmission impairment decomposition model established in the method described in any one of supplements 1-8, estimating a bit error penalty introduced into optical signals by total impairments and single impairments in a Raman amplified system; and determining primary impairments and secondary impairments in the Raman amplified system according to a magnitude of the bit error penalty introduced by the single impairments.

What is claimed is:

1. An apparatus for establishing a transmission impairment decomposition model for a Raman amplified system, the apparatus comprising:

a memory that stores a plurality of instructions; and
a processor coupled to the memory and configured to:
    convert a Jones vector of a test signal after passing through a Raman amplified system into a Stokes vector;
    calculate transmission impairments to which the test signal is subjected by using the Stokes vector according to a pre-established transmission impairment decomposition model; and
    substitute values of the transmission impairments into the pre-established transmission impairment decomposition model to obtain a complete transmission impairment decomposition model used for estimating transmission impairments,
wherein, the converting comprises:
    acquiring the test signal after passing through the Raman amplified system to reconstruct the Jones vector of the test signal as $[E_x, E_y]^T$;
    converting the Jones vector $[E_x, E_y]^T$ into a corresponding Stokes vector $[S_1, S_2, S_3]^T$;
    calculating a mean vector $[\langle S_1 \rangle, \langle S_2 \rangle, \langle S_3 \rangle]^T$ of the Stokes vector $[S_1, S_2, S_3]^T$ in a Stokes space; and
    performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtaining an optical intensity $S'_0 = \sqrt{|S'_1|^2+|S'_2|^2+|S'_3|^2}$ according to the new Stokes vector $[S'_1, S'_2, S'_3]^T$;

wherein, the transmission impairments comprise at least one of the following: a time-varying gain fluctuation, influence of cross polarization modulation on a polarization state of a signal, influence of cross phase modulation on a phase of a signal, and a dual-polarization ASE noise, wherein, the pre-established transmission impairment decomposition model is as follows:

$$\underbrace{\begin{bmatrix} E_{x,in} \\ E_{y,in} \end{bmatrix}}_{\text{Input signal}} \rightarrow \underbrace{\begin{bmatrix} G+\Delta & 0 \\ 0 & G+\Delta \end{bmatrix}}_{\text{Gain fluctuation}} \rightarrow \underbrace{\begin{bmatrix} \cos(\delta/2) & -j\sin(\delta/2) \\ -j\sin(\delta/2) & \cos(\delta/2) \end{bmatrix}}_{\text{45deg Retarder}} \rightarrow$$

$$\underbrace{\begin{bmatrix} \cos(\theta) & -\sin(\theta) \\ \sin(\theta) & \cos(\theta) \end{bmatrix}}_{\text{Rotator}} \rightarrow \underbrace{\begin{bmatrix} e^{j\varphi_{xpm}} & 0 \\ 0 & e^{j\varphi_{xpm}} \end{bmatrix}}_{\text{Phase noise}} \rightarrow \underset{\underset{\text{ASE noise}}{\begin{bmatrix} n_x \\ n_y \end{bmatrix}}}{+} \rightarrow \underbrace{\begin{bmatrix} E_{x,out} \\ E_{y,out} \end{bmatrix}}_{\text{Output signal}};$$

where, $[E_{x,in}, E_{y,in}]^T$ is a Jones vector of an optical signal before passing through the Raman amplified system, G is a Raman gain, $\Delta$ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system, wherein, the calculating comprises:
estimating the Raman gain G, power $\langle P_{AsE,BW=2f_{3dB,Rx}} \rangle$ and a random sample $[, n'_x, n'_x]^T$ of the ASE noise, and variance $\langle \Delta^2 \rangle$ and a random sample $n''_\Delta$ of the gain fluctuation, according to a spectrum of the optical intensity $S'_0$;
performing FFT transform on $S'_0$ to obtain the spectrum of $S'_0$;
calculating a peak value of zero-frequency parts of the spectrum of $S'_0$, squares low-frequency bulge parts of the spectrum of $S'_0$ and then sums them up, and squares high-frequency flat parts of the spectrum of $S'_0$ and then sums them up;
obtaining the Raman gain G, the variance $\langle \Delta^2 \rangle$ of the gain fluctuation and the power $\langle P_{AsE,BW=2f_{3dB,Rx}} \rangle$ of the ASE noise according to a result of calculation;
obtaining the random sample $n''_\Delta$ of the gain fluctuation according to the variance $\langle \Delta^2 \rangle$ of the gain fluctuation; and
obtaining the random sample $[n'_x, n'_y]^T$ of the ASE noise according to the power $\langle P_{AsE,BW=2f_{3dB,Rx}} \rangle$ of the ASE noise.

2. An apparatus for establishing a transmission impairment decomposition model for a Raman amplified system, the apparatus comprising:
a memory that stores a plurality of instructions; and
a processor coupled to the memory and configured to:
convert a Jones vector of a test signal after passing through a Raman amplified system into a Stokes vector;
calculate transmission impairments to which the test signal is subjected by using the Stokes vector according to a pre-established transmission impairment decomposition model; and
substitute values of the transmission impairments into the pre-established transmission impairment decomposition model to obtain a complete transmission impairment decomposition model used for estimating transmission impairments, wherein, the converting comprises:
acquiring the test signal after passing through the Raman amplified system to reconstruct the Jones vector of the test signal as $[E_x, E_y]^T$;
converting the Jones vector $[E_x, E_y]^T$ into a corresponding Stokes vector $[S_1, S_2, S_3]^T$;
calculating a mean vector $[\langle S_1 \rangle, \langle S_2 \rangle, \langle S_3 \rangle]^T$ of the Stokes vector $[S_1, S_2, S_3]^T$ in a Stokes space; and
performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$ and obtaining an optical intensity $S'_0 \sqrt{|S'_1|^2+|S'_2|^2+|S'_3|^2}$ according to the new Stokes vector $[S'_1, S'_2, S'_3]^T$, wherein, the transmission impairments comprise at least one of the following: a time-varying gain fluctuation, influence of cross polarization modulation on a polarization state of a signal, influence of cross phase modulation on a phase of a signal, and a dual-polarization ASE noise, wherein, the pre-established transmission impairment decomposition model is as follows:

$$\underbrace{\begin{bmatrix} E_{x,in} \\ E_{y,in} \end{bmatrix}}_{\text{Input signal}} \rightarrow \underbrace{\begin{bmatrix} G+\Delta & 0 \\ 0 & G+\Delta \end{bmatrix}}_{\text{Gain fluctuation}} \rightarrow \underbrace{\begin{bmatrix} \cos(\delta/2) & -j\sin(\delta/2) \\ -j\sin(\delta/2) & \cos(\delta/2) \end{bmatrix}}_{\text{45deg Retarder}} \rightarrow$$

$$\underbrace{\begin{bmatrix} \cos(\theta) & -\sin(\theta) \\ \sin(\theta) & \cos(\theta) \end{bmatrix}}_{\text{Rotator}} \rightarrow \underbrace{\begin{bmatrix} e^{j\varphi_{xpm}} & 0 \\ 0 & e^{j\varphi_{xpm}} \end{bmatrix}}_{\text{Phase noise}} \rightarrow \underset{\underset{\text{ASE noise}}{\begin{bmatrix} n_x \\ n_y \end{bmatrix}}}{+} \rightarrow \underbrace{\begin{bmatrix} E_{x,out} \\ E_{y,out} \end{bmatrix}}_{\text{Output signal}};$$

where, $[E_{x,in}, E_{y,in}]^T$ is a Jones vector of an optical signal before passing through the Raman amplified system, G is a Raman gain, $\Delta$ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system, wherein, the calculating comprises:
estimating variance $\langle (n'''_\theta)^2 \rangle$ and a random sample $n'''_\theta$ of polarization rotation $\theta$ according to a spectrum and a autocorrelation value of $S'_2$;
performing FFT transform on $S'_2$ to obtain the spectrum of $S'_2$;
extracting low-frequency bulge parts of the spectrum of $S'_2$ and takes them as filters to filter a Gaussian white noise $n_\theta$ to obtain a colored noise $n'_\theta$;
calculating variance $\langle \sin^2(2\theta) \rangle$ of $\sin(2\theta)$ according to the autocorrelation value of $S'_2$ at the same moment;

locking power of the colored noise $n'_\theta$ at the variance $\langle \sin^2(2\theta) \rangle$ to obtain a random sample $n''_\theta$ of $\sin(2\theta)$; and obtaining the random sample $n'''_\theta$ and the variance $\langle (n'''_\theta)^2 \rangle$ of the polarization rotation $\theta$ according to the random sample $n''_\theta$ of $\sin(2\theta)$.

3. An apparatus for establishing a transmission impairment decomposition model for a Raman amplified system, the apparatus comprising:
a memory that stores a plurality of instructions; and
a processor coupled to the memory and configured to:
convert a Jones vector of a test signal after passing through a Raman amplified system into a Stokes vector;
calculate transmission impairments to which the test signal is subjected by using the Stokes vector according to a pre-established transmission impairment decomposition model; and
substitute values of the transmission impairments into the pre-established transmission impairment decomposition model to obtain a complete transmission impairment decomposition model used for estimating transmission impairments,
wherein, the converting comprises:
acquiring the test signal after passing through the Raman amplified system to reconstruct the Jones vector of the test signal as $[E_x, E_y]^T$;
converting the Jones vector $[E_x, E_y]^T$ into a corresponding Stokes vector $[S_1, S_2, S_3]^T$;
calculating a mean vector $[\langle S_1 \rangle, \langle S_2 \rangle, \langle S_3 \rangle]^T$ of the Stokes vector $[S_1, S_2, S_3]^T$ in a Stokes space; and
performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtaining an optical intensity $S'_0 \sqrt{|S'_1|^2 + |S'_2|^2 + |S'_3|^2}$ according to the new Stokes vector $[S'_1, S'_2, S'_3]^T$,
wherein, the transmission impairments comprise at least one of the following: a time-varying gain fluctuation, influence of cross polarization modulation on a polarization state of a signal, influence of cross phase modulation on a phase of a signal, and a dual-polarization ASE noise,
wherein, the pre-established transmission impairment decomposition model is as follows:

$$\begin{bmatrix} E_{x,in} \\ E_{y,in} \end{bmatrix}_{\text{Input signal}} \to \begin{bmatrix} G+\Delta & 0 \\ 0 & G+\Delta \end{bmatrix}_{\text{Gain fluctuation}} \to \begin{bmatrix} \cos(\delta/2) & -j\sin(\delta/2) \\ -j\sin(\delta/2) & \cos(\delta/2) \end{bmatrix}_{\text{45deg Retarder}} \to$$

$$\begin{bmatrix} \cos(\theta) & -\sin(\theta) \\ \sin(\theta) & \cos(\theta) \end{bmatrix}_{\text{Rotator}} \to \begin{bmatrix} e^{j\varphi_{xpm}} & 0 \\ 0 & e^{j\varphi_{xpm}} \end{bmatrix}_{\text{Phase noise}} \to + \uparrow \begin{bmatrix} n_x \\ n_y \end{bmatrix}_{\text{ASE noise}} \to \begin{bmatrix} E_{x,out} \\ E_{y,out} \end{bmatrix}_{\text{Output signal}};$$

where, $[E_{x,in}, E_{y,in}]^T$ is a Jones vector of an optical signal before passing through the Raman amplified system, G is a Raman gain, $\Delta$ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system, wherein, the calculating comprises:
estimating variance $\langle (n'''_{\delta/2})^2 \rangle$ and a random sample $n'''_{\delta/2}$ of phase delay $\delta/2$ according to a spectrum and a autocorrelation value of $S'_3$;
performing FFT transform on $S'_3$ to obtain the spectrum of $S'_3$;
extracting low-frequency bulge parts of the spectrum of $S'_3$ and takes them as filters to filter a Gaussian white noise $n_{\delta/2}$ to obtain a colored noise $n'_{\delta/2}$;
calculating variance $\langle \sin^2(\delta) \rangle$ of $\sin(\delta)$ according to the autocorrelation value of $S'_3$ at the same moment;
locking power of the colored noise $n'_{\delta/2}$ at the variance $\langle \sin^2(\delta) \rangle$ to obtain a random sample $n''_{\delta/2}$ of $\sin(\delta)$; and
obtaining the random sample $n'''_{\delta/2}$ and the variance $\langle (n'''_{\delta/2})^2 \rangle$ of the phase delay $\delta/2$ according to the random sample $n''_{\delta/2}$ of $\sin(\delta)$.

4. An apparatus for establishing a transmission impairment decomposition model for a Raman amplified system, the apparatus comprising:
a memory that stores a plurality of instructions; and
a processor coupled to the memory and configured to:
convert a Jones vector of a test signal after passing through a Raman amplified system into a Stokes vector;
calculate transmission impairments to which the test signal is subjected by using the Stokes vector according to a pre-established transmission impairment decomposition model; and
substitute values of the transmission impairments into the pre-established transmission impairment decomposition model to obtain a complete transmission impairment decomposition model used for estimating transmission impairments,
wherein, the converting comprises:
acquiring the test signal after passing through the Raman amplified system to reconstruct the Jones vector of the test signal as $[E_x, E_y]^T$;
converting the Jones vector $[E_x, E_y]^T$ into a corresponding Stokes vector $[S_1, S_2, S_3]^T$;
calculating a mean vector $[\langle S_1 \rangle, \langle S_2 \rangle, \langle S_3 \rangle]^T$ of the Stokes vector $[S_1, S_2, S_3]^T$ in a Stokes space; and
performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtaining an optical intensity $S'_0 = \sqrt{|S'_1|^2 + |S'_2|^2 + |S'_3|^2}$ according to the new Stokes vector $[S'_1, S'_2, S'_3]^T$,
wherein, the transmission impairments comprise at least one of the following: a time-varying gain fluctuation, influence of cross polarization modulation on a polarization state of a signal, influence of cross phase modulation on a phase of a signal, and a dual-polarization ASE noise,
wherein, the pre-established transmission impairment decomposition model is as follows:

$$\begin{bmatrix} E_{x,in} \\ E_{y,in} \end{bmatrix}_{\text{Input signal}} \to \begin{bmatrix} G+\Delta & 0 \\ 0 & G+\Delta \end{bmatrix}_{\text{Gain fluctuation}} \to \begin{bmatrix} \cos(\delta/2) & -j\sin(\delta/2) \\ -j\sin(\delta/2) & \cos(\delta/2) \end{bmatrix}_{\text{45deg Retarder}} \to$$

-continued $$\underbrace{\begin{bmatrix} \cos(\theta) & -\sin(\theta) \\ \sin(\theta) & \cos(\theta) \end{bmatrix}}_{Rotator} \rightarrow \underbrace{\begin{bmatrix} e^{j\varphi_{xpm}} & 0 \\ 0 & e^{j\varphi_{xpm}} \end{bmatrix}}_{Phase\ noise} \rightarrow \underset{\underset{ASE\ noise}{\begin{bmatrix} n_x \\ n_y \end{bmatrix}}}{+} \rightarrow \underbrace{\begin{bmatrix} E_{x,out} \\ E_{y,out} \end{bmatrix}}_{Output\ signal};$$

where, $[E_{x,in}, E_{y,in}]^T$ is a Jones vector of an optical signal before passing through the Raman amplified system, G is a Raman gain, Δ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system, wherein, the calculating comprises:
estimating variance $\langle (n'''_{\varphi_{xpm}})^2 \rangle$ and a random sample $n'''_{\varphi_{xpm}}$ of a phase noise $\varphi_{xpm}$ according to the phase noise $\varphi_{xpm}$ and the phase delay δ/2.

5. An apparatus for estimating a bit error penalty of a Raman amplified system, the apparatus comprising:
a memory that stores a plurality of instructions; and
a processor coupled to the memory and configured to:
estimate a bit error penalty introduced into optical signals by total impairments and single impairments in a Raman amplified system, using a complete transmission impairment decomposition model for a Raman amplified system established by using an apparatus for establishing a transmission impairment decomposition model for a Raman amplified system;
determine primary impairments and secondary impairments in the Raman amplified system according to a magnitude of the bit error penalty introduced by the single impairments,
wherein, the apparatus for establishing a transmission impairment decomposition model for a Raman amplified system comprises:
a memory that stores a plurality of instructions; and
a processor coupled to the memory and configured to:
convert a Jones vector of a test signal after passing through a Raman amplified system into a Stokes vector;
calculate transmission impairments to which the test signal is subjected by using the Stokes vector according to a pre-established transmission impairment decomposition model; and
substitute values of the transmission impairments into the pre-established transmission impairment decomposition model to obtain a complete transmission impairment decomposition model used for estimating transmission impairments,
wherein, the converting comprises:
acquiring the test signal after passing through the Raman amplified system to reconstruct the Jones vector of the test signal as $[E_x, E_y]^T$;
converting the Jones vector $[E_x, E_y]^T$ into a corresponding Stokes vector $[S_1, S_2, S_3]^T$;
calculating a mean vector $[\langle S_1 \rangle, \langle S_2 \rangle, \langle S_3 \rangle]^T$ of the Stokes vector $[S_1, S_2, S_3]^T$ in a Stokes space; and
performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtaining an optical intensity $S'_0 \sqrt{|S'_1|^2+|S'_2|^2+|S'_3|^2}$ according to the new Stokes vector $[S'_1, S'_2, S'_3]^T$, wherein, the transmission impairments comprise at least one of the following: a time-varying gain fluctuation, influence of cross polarization modulation on a polarization state of a signal, influence of cross phase modulation on a phase of a signal, and a dual-polarization ASE noise, wherein, the pre-established transmission impairment decomposition model is as follows:

$$\underbrace{\begin{bmatrix} E_{x,in} \\ E_{y,in} \end{bmatrix}}_{Input\ signal} \rightarrow \underbrace{\begin{bmatrix} G+\Delta & 0 \\ 0 & G+\Delta \end{bmatrix}}_{Gain\ fluctuation} \rightarrow \underbrace{\begin{bmatrix} \cos(\delta/2) & -j\sin(\delta/2) \\ -j\sin(\delta/2) & \cos(\delta/2) \end{bmatrix}}_{45deg\ Retarder} \rightarrow$$

$$\underbrace{\begin{bmatrix} \cos(\theta) & -\sin(\theta) \\ \sin(\theta) & \cos(\theta) \end{bmatrix}}_{Rotator} \rightarrow \underbrace{\begin{bmatrix} e^{j\varphi_{xpm}} & 0 \\ 0 & e^{j\varphi_{xpm}} \end{bmatrix}}_{Phase\ noise} \rightarrow \underset{\underset{ASE\ noise}{\begin{bmatrix} n_x \\ n_y \end{bmatrix}}}{+} \rightarrow \underbrace{\begin{bmatrix} E_{x,out} \\ E_{y,out} \end{bmatrix}}_{Output\ signal};$$

where, $[E_{x,in}, E_{y,in}]^T$ is a Jones vector of an optical signal before passing through the Raman amplified system, G is a Raman gain, Δ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]T$ is a dual-polarization ASE noise, and $[E_{x,out}, E_{y,out}]^T$ is a Jones vector of the optical signal after passing through the Raman amplified system, wherein, the calculating comprises:
estimating the Raman gain G, power $\langle P_{AsE,BW=2f_{3dB,Rx}} \rangle$ and a random sample $[n'_x, n'_y]^T$ of the ASE noise, and variance $\langle \Delta^2 \rangle$ and a random sample $n''_\Delta$ of the gain fluctuation, according to a spectrum of the optical intensity $S'_0$;
performing FFT transform on $S'_0$ to obtain the spectrum of $S'_0$;
calculating a peak value of zero-frequency parts of the spectrum of $S'_0$, squares low-frequency bulge parts of the spectrum of $S'_0$ and then sums them up, and squares high-frequency flat parts of the spectrum of $S'_0$ and then sums them up;
obtaining the Raman gain G, the variance $\langle \Delta^2 \rangle$ of the gain fluctuation and the power $\langle P_{ASE,BW=2f_{3dB,Rx}} \rangle$ of the ASE noise according to a result of calculation;
obtaining the random sample $n''_\Delta$ of the gain fluctuation according to the variance $\langle \Delta^2 \rangle$ of the gain fluctuation; and
obtaining the random sample $[n'_x, n'_y]^T$ of the ASE noise according to the power $\langle P_{ASE,BW=2f_{3dB,Rx}} \rangle$ of the ASE noise.

6. An optical communications system, comprising:
an apparatus for establishing a transmission impairment decomposition model for the optical communications system,
an apparatus for estimating a bit error penalty, the apparatus for estimating a bit error penalty comprises:
estimate a bit error penalty introduced into optical signals by total impairments and single impairments in the optical communications system, by using the complete transmission impairment decomposition model; and determine primary impairments and secondary impairments in the optical communications system according to a magnitude of the bit error penalty introduced by the single impairments, the apparatus for establishing a transmission impairment decomposition model for the optical communications system comprises:

a memory that stores a plurality of instructions; and a processor coupled to the memory and configured to:

convert a Jones vector of a test signal after passing through a Raman amplified system into a Stokes vector;

calculate transmission impairments to which the test signal is subjected by using the Stokes vector according to a pre-established transmission impairment decomposition model; and substitute values of the transmission impairments into the pre-established transmission impairment decomposition model to obtain a complete transmission impairment decomposition model used for estimating transmission impairments, wherein, the converting comprises:

acquiring the test signal after passing through the Raman amplified system to reconstruct the Jones vector of the test signal as $[E_x, E_y]^T$;

converting the Jones vector $[E_x, E_y]^T$ into a corresponding Stokes vector $[S_1, S_2, S_3]^T$;

calculating a mean vector $[\langle S_1\rangle, \langle S_2\rangle, \langle S_3\rangle]^T$ of the Stokes vector $[S_1, S_2, S_3]^T$ in a Stokes space; and performing Stokes space rotation, converting $\langle S_2\rangle$ and $\langle S_3\rangle$ of the mean vector $[\langle S_1\rangle, \langle S_2\rangle, \langle S_3\rangle]^T$ into 0 to obtain a new Stokes vector $[S'_1, S'_2, S'_3]^T$, and obtaining an optical intensity $S'_0=\sqrt{|S'_1|^2+|S'_2|^2+|S'_3|^2}$ according to the new Stokes vector $[S'_1, S'_2, S'_3]^T$;

wherein, the transmission impairments comprise at least one of the following: a time-varying gain fluctuation, influence of cross polarization modulation on a polarization state of a signal, influence of cross phase modulation on a phase of a signal, and a dual-polarization ASE noise, wherein, the pre-established transmission impairment decomposition model is as follows:

$$\begin{bmatrix} E_{x,in} \\ E_{y,in} \end{bmatrix}_{\text{Input signal}} \rightarrow \begin{bmatrix} G+\Delta & 0 \\ 0 & G+\Delta \end{bmatrix}_{\text{Gain fluctuation}} \rightarrow \begin{bmatrix} \cos(\delta/2) & -j\sin(\delta/2) \\ -j\sin(\delta/2) & \cos(\delta/2) \end{bmatrix}_{\text{45deg Retarder}} \rightarrow$$

$$\begin{bmatrix} \cos(\theta) & -\sin(\theta) \\ \sin(\theta) & \cos(\theta) \end{bmatrix}_{\text{Rotator}} \rightarrow \begin{bmatrix} e^{j\varphi_{xpm}} & 0 \\ 0 & e^{j\varphi_{xpm}} \end{bmatrix}_{\text{Phase noise}} \rightarrow + \begin{bmatrix} n_x \\ n_y \end{bmatrix}_{\text{ASE noise}} \rightarrow \begin{bmatrix} E_{x,out} \\ E_{y,out} \end{bmatrix}_{\text{Output signal}};$$

where, $[E_{x,in}, E_{y,in}]^T$ is a Jones vector of an optical signal before passing through the Raman amplified system, G is a Raman gain, $\Delta$ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system, wherein, the calculating comprises:

estimating the Raman gain G, power $\langle P_{ASE,BW=2f_{3dB,Rx}}\rangle$ and a random sample $[n'_x, n'_y]^T$ of the ASE noise, and variance $\langle \Delta^2\rangle$ and a random sample $n''_\Delta$ of the gain fluctuation, according to a spectrum of the optical intensity $S'_0$;

performing FFT transform on $S'_0$ to obtain the spectrum of $S'_0$;

calculating a peak value of zero-frequency parts of the spectrum of $S'_0$, squares low-frequency bulge parts of the spectrum of $S'_0$ and then sums them up, and squares high-frequency flat parts of the spectrum of $S'_0$ and then sums them up;

obtaining the Raman gain G, the variance $\langle \Delta^2\rangle$ of the gain fluctuation and the power $\langle P_{ASE,BW=2f_{3dB,Rx}}\rangle$ of the ASE noise according to a result of calculation;

obtaining the random sample $n''_\Delta$ of the gain fluctuation according to the variance $\langle \Delta^2\rangle$ of the gain fluctuation; and obtaining the random sample $[n'_x, n'_y]^T$ of the ASE noise according to the power $\langle P_{ASE,BW=2f_{3dB,Rx}}\rangle$ of the ASE noise.

7. An apparatus for estimating a bit error penalty of a Raman amplified system, the apparatus comprising:

a memory that stores a plurality of instructions; and a processor coupled to the memory and configured to:

estimate a bit error penalty introduced into optical signals by total impairments and single impairments in a Raman amplified system, using a complete transmission impairment decomposition model for a Raman amplified system established by using an apparatus for establishing a transmission impairment decomposition model for a Raman amplified system; and determine primary impairments and secondary impairments in the Raman amplified system according to a magnitude of the bit error penalty introduced by the single impairments, wherein, the apparatus for establishing a transmission impairment decomposition model for a Raman amplified system comprises:

a memory that stores a plurality of instructions; and a processor coupled to the memory and configured to:

convert a Jones vector of a test signal after passing through a Raman amplified system into a Stokes vector;

calculate transmission impairments to which the test signal is subjected by using the Stokes vector according to a pre-established transmission impairment decomposition model; and substitute values of the transmission impairments into the pre-established transmission impairment decomposition model to obtain a complete transmission impairment decomposition model used for estimating transmission impairments, wherein, the converting comprises:

acquiring the test signal after passing through the Raman amplified system to reconstruct the Jones vector of the test signal as $[E_x, E_y]^T$;

converting the Jones vector $[E_x, E_y]^T$ into a corresponding Stokes vector $[S_1, S_2, S_3]^T$;

calculating a mean vector $[\langle S_1\rangle, \langle S_2\rangle, \langle S_3\rangle]^T$ of the Stokes vector $[S_1, S_2, S_3]^T$ in a Stokes space; and performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtaining an optical intensity $S'_0 = \sqrt{|S'_1|^2 + |S'_2|^2 + |S'_3|^2}$ according to the new Stokes vector $[S'_1, S'_2, S'_3]^T$, wherein, the transmission impairments comprise at least one of the following: a time-varying gain fluctuation, influence of cross polarization modulation on a polarization state of a signal, influence of cross phase modulation on a phase of a signal, and a dual-polarization ASE noise, wherein, the pre-established transmission impairment decomposition model is as follows:

$$\underbrace{\begin{bmatrix} E_{x,in} \\ E_{y,in} \end{bmatrix}}_{\text{Input signal}} \rightarrow \underbrace{\begin{bmatrix} G+\Delta & 0 \\ 0 & G+\Delta \end{bmatrix}}_{\text{Gain fluctuation}} \rightarrow \underbrace{\begin{bmatrix} \cos(\delta/2) & -j\sin(\delta/2) \\ -j\sin(\delta/2) & \cos(\delta/2) \end{bmatrix}}_{\text{45deg Retarder}} \rightarrow$$

$$\underbrace{\begin{bmatrix} \cos(\theta) & -\sin(\theta) \\ \sin(\theta) & \cos(\theta) \end{bmatrix}}_{\text{Rotator}} \rightarrow \underbrace{\begin{bmatrix} e^{j\varphi xpm} & 0 \\ 0 & e^{j\varphi xpm} \end{bmatrix}}_{\text{Phase noise}} \rightarrow \underbrace{+\uparrow \begin{bmatrix} n_x \\ n_y \end{bmatrix}}_{\text{ASE noise}} \rightarrow \underbrace{\begin{bmatrix} E_{x,out} \\ E_{y,out} \end{bmatrix}}_{\text{Output signal}};$$

where, $[E_{x,in}, E_{y,in}]^T$ is a Jones vector of an optical signal before passing through the Raman amplified system, G is a Raman gain, $\Delta$ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system, wherein, the calculating comprises:
estimating variance $\langle (N'''_\theta)^2 \rangle$ and a random sample $n'''_\theta$ of polarization rotation $\theta$ according to a spectrum and a autocorrelation value of $S'_2$;
performing FFT transform on $S'_2$ to obtain the spectrum of $S'_2$;
extracting low-frequency bulge parts of the spectrum of $S'_2$ and takes them as filters to filter a Gaussian white noise $n_\theta$ to obtain a colored noise $n'_\theta$;
calculating variance $\langle \sin^2(2\theta) \rangle$ of $\sin(2\theta)$ according to the autocorrelation value of $S'_2$ at the same moment;
locking power of the colored noise $n'''_\theta$ at the variance $\langle \sin^2(2\theta) \rangle$ to obtain a random sample $n'''_\theta$ of $\sin(2\theta)$; and
obtaining the random sample $n'''_\theta$ and the variance $\langle (n'''_\theta)^2 \rangle$ of the polarization rotation $\theta$ according to the random sample $n''_\theta$ of $\sin(2\theta)$.

8. An apparatus for estimating a bit error penalty of a Raman amplified system, the apparatus comprising:
a memory that stores a plurality of instructions; and
a processor coupled to the memory and configured to:
estimate a bit error penalty introduced into optical signals by total impairments and single impairments in a Raman amplified system, using a complete transmission impairment decomposition model for a Raman amplified system established by using an apparatus for establishing a transmission impairment decomposition model for a Raman amplified system; and
determine primary impairments and secondary impairments in the Raman amplified system according to a magnitude of the bit error penalty introduced by the single impairments, wherein, the apparatus for establishing a transmission impairment decomposition model for a Raman amplified system comprises:
a memory that stores a plurality of instructions; and
a processor coupled to the memory and configured to:
convert a Jones vector of a test signal after passing through a Raman amplified system into a Stokes vector;
calculate transmission impairments to which the test signal is subjected by using the Stokes vector according to a pre-established transmission impairment decomposition model; and
substitute values of the transmission impairments into the pre-established transmission impairment decomposition model to obtain a complete transmission impairment decomposition model used for estimating transmission impairments, wherein, the converting comprises:
acquiring the test signal after passing through the Raman amplified system to reconstruct the Jones vector of the test signal as $[E_x, E_y]^T$;
converting the Jones vector $[E_x, E_y]^T$ into a corresponding Stokes vector $[S_1, S_2, S_3]^T$;
calculating a mean vector $[\langle S_1 \rangle, \langle S_2 \rangle, \langle S_3 \rangle]^T$ of the Stokes vector $[S_1, S_2, S_3]^T$ in a Stokes space; and
performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_0, S'_2, S'_3]^T$, and obtaining an optical intensity $S'_0 = \sqrt{|S'_1|^2 + |S'_2|^2 + |S'_3|^2}$ according to the new Stokes vector $[S'_1, S'_2, S'_3]^T$, wherein, the transmission impairments comprise at least one of the following: a time-varying gain fluctuation, influence of cross polarization modulation on a polarization state of a signal, influence of cross phase modulation on a phase of a signal, and a dual-polarization ASE noise, wherein, the pre-established transmission impairment decomposition model is as follows:

$$\underbrace{\begin{bmatrix} E_{x,in} \\ E_{y,in} \end{bmatrix}}_{\text{Input signal}} \rightarrow \underbrace{\begin{bmatrix} G+\Delta & 0 \\ 0 & G+\Delta \end{bmatrix}}_{\text{Gain fluctuation}} \rightarrow \underbrace{\begin{bmatrix} \cos(\delta/2) & -j\sin(\delta/2) \\ -j\sin(\delta/2) & \cos(\delta/2) \end{bmatrix}}_{\text{45deg Retarder}} \rightarrow$$

$$\underbrace{\begin{bmatrix} \cos(\theta) & -\sin(\theta) \\ \sin(\theta) & \cos(\theta) \end{bmatrix}}_{\text{Rotator}} \rightarrow \underbrace{\begin{bmatrix} e^{j\varphi xpm} & 0 \\ 0 & e^{j\varphi xpm} \end{bmatrix}}_{\text{Phase noise}} \rightarrow \underbrace{+\uparrow \begin{bmatrix} n_x \\ n_y \end{bmatrix}}_{\text{ASE noise}} \rightarrow \underbrace{\begin{bmatrix} E_{x,out} \\ E_{y,out} \end{bmatrix}}_{\text{Output signal}};$$

where, $[E_{x,in}, E_{y,in}]^T$ is a Jones vector of an optical signal before passing through the Raman amplified system, G is a Raman gain, $\Delta$ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_{x}]^T$ is a dual-polarization ASE noise, and $[E_{x,out}, E_{y,out}]^T$ is a Jones vector of the optical signal after passing through the Raman amplified system, wherein, the calculating comprises:
estimating variance $\langle (n'''_{\delta/2})^2 \rangle$ and a random sample $n'''\delta/2$ of phase delay $\delta/2$ according to a spectrum and a autocorrelation value of $S'_3$;
performing FFT transform on $S'_3$ to obtain the spectrum of $S'_3$;
extracting low-frequency bulge parts of the spectrum of $S'_3$ and takes them as filters to filter a Gaussian white noise $n_{\delta/2}$ to obtain a colored noise $N'_{\delta/2}$;
calculating variance $\langle \sin^2(\delta) \rangle$ of $\sin(\delta)$ according to the autocorrelation value of $S'_3$ at the same moment;
locking power of the colored noise $n'_{\delta/2}$ at the variance $\langle \sin^2(\delta) \rangle$ to obtain a random sample $n''_{\delta/2}$ of $\sin(\delta)$; and
obtaining the random sample $n'''_{\delta/2}$ and the variance $\langle (n'''_{\delta/2})^2 \rangle$ of the phase delay $\delta/2$ according to the random sample $n''_{\delta/2}$ of $\sin(\delta)$.

9. An apparatus for estimating a bit error penalty of a Raman amplified system, the apparatus comprising:
a memory that stores a plurality of instructions; and
a processor coupled to the memory and configured to:
estimate a bit error penalty introduced into optical signals by total impairments and single impairments in a Raman amplified system, using a complete transmission impairment decomposition model for a Raman amplified system established by using an apparatus for establishing a transmission impairment decomposition model for a Raman amplified system; and
determine primary impairments and secondary impairments in the Raman amplified system according to a magnitude of the bit error penalty introduced by the single impairments,
wherein, the apparatus for establishing a transmission impairment decomposition model for a Raman amplified system comprises:
a memory that stores a plurality of instructions; and
a processor coupled to the memory and configured to:
convert a Jones vector of a test signal after passing through a Raman amplified system into a Stokes vector;
calculate transmission impairments to which the test signal is subjected by using the Stokes vector according to a pre-established transmission impairment decomposition model; and
substitute values of the transmission impairments into the pre-established transmission impairment decomposition model to obtain a complete transmission impairment decomposition model used for estimating transmission impairments,
wherein, the converting comprises:
acquiring the test signal after passing through the Raman amplified system to reconstruct the Jones vector of the test signal as $[E_x, E_y]^T$;
converting the Jones vector $[E_x, E_y]^T$ into a corresponding Stokes vector $[S_1, S_2, S_3]^T$;
calculating a mean vector $[\langle S_1 \rangle, \langle S_2 \rangle, \langle S_3 \rangle]^T$ of the Stokes vector $[S_1, S_2, S_3]^T$ in a Stokes space; and
performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtaining an optical intensity $S'_0 = \sqrt{|S'_1|^2+|S'_2|^2+|S'_3|^2}$ according to the new Stokes vector $[S'_1, S'_2, S'_3]^T$, wherein, the transmission impairments comprise at least one of the following: a time-varying gain fluctuation, influence of cross polarization modulation on a polarization state of a signal, influence of cross phase modulation on a phase of a signal, and a dual-polarization ASE noise, wherein, the pre-established transmission impairment decomposition model is as follows:

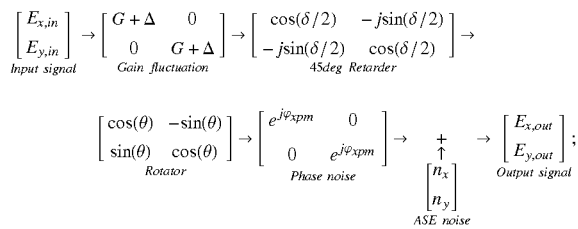

where, $[E_{x,in}, E_{y,in}]^T$ is a Jones vector of an optical signal before passing through the Raman amplified system, G is a Raman gain, $\Delta$ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system, wherein, the calculating comprises:
estimating variance $\langle (n'''_{\varphi xpm})^2 \rangle$ and a random sample $n'''_{\varphi xpm}$ of a phase noise $\varphi_{xpm}$ according to the phase noise $\varphi_{xpm}$ and the phase delay $\delta/2$.

10. An optical communications system, comprising:
an apparatus for establishing a transmission impairment decomposition model for the optical communications system, and
an apparatus for estimating a bit error penalty, the apparatus for estimating a bit error penalty comprises:
a memory that stores a plurality of instructions; and
a processor coupled to the memory and configured to:
estimate a bit error penalty introduced into optical signals by total impairments and single impairments in the optical communications system, by using the complete transmission impairment decomposition model; and
determine primary impairments and secondary impairments in the optical communications system according to a magnitude of the bit error penalty introduced by the single impairments;
the apparatus for establishing a transmission impairment decomposition model for the optical communications system comprises:
a memory that stores a plurality of instructions; and
a processor coupled to the memory and configured to:
convert a Jones vector of a test signal after passing through a Raman amplified system into a Stokes vector;
calculate transmission impairments to which the test signal is subjected by using the Stokes vector according to a pre-established transmission impairment decomposition model; and substitute values of the transmission impairments into the pre-established transmission impairment decomposition model to obtain a complete transmission impairment decomposition model used for estimating transmission impairments, wherein, the converting comprises:

acquiring the test signal after passing through the Raman amplified system to reconstruct the Jones vector of the test signal as $[E_x, E_y]^T$;

converting the Jones vector $[E_x, E_y]^T$ into a corresponding Stokes vector $[S_1, S_2, S_3]^T$;

calculating a mean vector $[\langle S_1 \rangle, \langle S_2 \rangle, \langle S_3 \rangle]^T$ of the Stokes vector $[S_1, S_2, S_3]^T$ in a Stokes space; and performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtaining an optical intensity $S'_0 = \sqrt{|S'_1|^2 + |S'_2|^2 + |S'_3|^2}$ according to the new Stokes vector $[S'_1, S'_2, S'_3]^T$, wherein, the transmission impairments comprise at least one of the following: a time-varying gain fluctuation, influence of cross polarization modulation on a polarization state of a signal, influence of cross phase modulation on a phase of a signal, and a dual-polarization ASE noise, wherein, the pre-established transmission impairment decomposition model is as follows:

$$\underbrace{\begin{bmatrix} E_{x,in} \\ E_{y,in} \end{bmatrix}}_{\text{Input signal}} \to \underbrace{\begin{bmatrix} G+\Delta & 0 \\ 0 & G+\Delta \end{bmatrix}}_{\text{Gain fluctuation}} \to \underbrace{\begin{bmatrix} \cos(\delta/2) & -j\sin(\delta/2) \\ -j\sin(\delta/2) & \cos(\delta/2) \end{bmatrix}}_{\text{45deg Retarder}} \to$$

$$\underbrace{\begin{bmatrix} \cos(\theta) & -\sin(\theta) \\ \sin(\theta) & \cos(\theta) \end{bmatrix}}_{\text{Rotator}} \to \underbrace{\begin{bmatrix} e^{j\varphi_{xpm}} & 0 \\ 0 & e^{j\varphi_{xpm}} \end{bmatrix}}_{\text{Phase noise}} \to \underbrace{+\begin{bmatrix} n_x \\ n_y \end{bmatrix}}_{\text{ASE noise}} \to \underbrace{\begin{bmatrix} E_{x,out} \\ E_{y,out} \end{bmatrix}}_{\text{Output signal}};$$

where, $[E_{x,in}, E_{y,in}]^T$ is a Jones vector of an optical signal before passing through the Raman amplified system, G is a Raman gain, $\Delta$ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system, wherein, the calculating comprises:

estimating variance $\langle (n'''_\theta)^2 \rangle$ and a random sample $n'''_\theta$ of polarization rotation $\theta$ according to a spectrum and a autocorrelation value of $S'_2$;

performing FFT transform on $S'_2$ to obtain the spectrum of $S'_2$;

extracting low-frequency bulge parts of the spectrum of $S'_2$ and takes them as filters to filter a Gaussian white noise $n_\theta$ to obtain a colored noise $n'_\theta$;

calculating variance $\langle \sin^2(2\theta) \rangle$ of $\sin(2\theta)$ according to the autocorrelation value of $S'_2$ at the same moment; locking power of the colored noise $n'_\theta$ at the variance $\langle \sin^2(2\theta) \rangle$ to obtain a random sample $n''_\theta$; of $\sin(2\theta)$; and obtaining the random sample $n'''_\theta$ and the variance $\langle (n'''_\theta)^2 \rangle$ of the polarization rotation $\theta$ according to the random sample $n'_\theta$ of $\sin(2\theta)$.

11. An optical communications system, comprising:

an apparatus for establishing a transmission impairment decomposition model for the optical communications system, and an apparatus for estimating a bit error penalty, the apparatus for estimating a bit error penalty comprises:

a memory that stores a plurality of instructions; and a processor coupled to the memory and configured to:

estimate a bit error penalty introduced into optical signals by total impairments and single impairments in the optical communications system, by using the complete transmission impairment decomposition model; and determine primary impairments and secondary impairments in the optical communications system according to a magnitude of the bit error penalty introduced by the single impairments;

the apparatus for establishing a transmission impairment decomposition model for the optical communications system comprises:

a memory that stores a plurality of instructions; and a processor coupled to the memory and configured to:

convert a Jones vector of a test signal after passing through a Raman amplified system into a Stokes vector;

calculate transmission impairments to which the test signal is subjected by using the Stokes vector according to a pre-established transmission impairment decomposition model; and substitute values of the transmission impairments into the pre-established transmission impairment decomposition model to obtain a complete transmission impairment decomposition model used for estimating transmission impairments, wherein, the converting comprises:

acquiring the test signal after passing through the Raman amplified system to reconstruct the Jones vector of the test signal as $[E_x, E_y]$;

converting the Jones vector $[E_x, E_y]^T$ into a corresponding Stokes vector $[S_1, S_2, S_3]^T$;

calculating a mean vector $[\langle S_1 \rangle, \langle S_2 \rangle, \langle S_3 \rangle]^T$ of the Stokes vector $[S_1, S_2, S_3]^T$ in a Stokes space; and performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtaining an optical intensity $S'_0 = \sqrt{|S'_1|^2 + |S'_2|^2 + |S'_3|^2}$ according to the new Stokes vector $[S_1, S_2, S_3]^T$, wherein, the transmission impairments comprise at least one of the following: a time-varying gain fluctuation, influence of cross polarization modulation on a polarization state of a signal, influence of cross phase modulation on a phase of a signal, and a dual-polarization ASE noise, wherein, the pre-established transmission impairment decomposition model is as follows:

$$\underbrace{\begin{bmatrix} E_{x,in} \\ E_{y,in} \end{bmatrix}}_{\text{Input signal}} \to \underbrace{\begin{bmatrix} G+\Delta & 0 \\ 0 & G+\Delta \end{bmatrix}}_{\text{Gain fluctuation}} \to \underbrace{\begin{bmatrix} \cos(\delta/2) & -j\sin(\delta/2) \\ -j\sin(\delta/2) & \cos(\delta/2) \end{bmatrix}}_{\text{45deg Retarder}} \to$$

-continued $$\begin{bmatrix} \cos(\theta) & -\sin(\theta) \\ \sin(\theta) & \cos(\theta) \end{bmatrix} \underset{Rotator}{\rightarrow} \begin{bmatrix} e^{j\varphi_{xpm}} & 0 \\ 0 & e^{j\varphi_{xpm}} \end{bmatrix} \underset{Phase\ noise}{\rightarrow} \underset{\underset{ASE\ noise}{\begin{bmatrix} n_x \\ n_y \end{bmatrix}}}{\overset{+}{\uparrow}} \rightarrow \begin{bmatrix} E_{x,out} \\ E_{y,out} \end{bmatrix}_{Output\ signal};$$

where, $[E_{x,in}, E_{y,in}]^T$ is a Jones vector of an optical signal before passing through the Raman amplified system, G is a Raman gain, Δ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system, wherein, the calculating comprises:
estimating variance $\langle (n'''_{\delta/2})^2 \rangle$ and a random sample $n'''_{\delta/2}$ of phase delay δ/2 according to a spectrum and a autocorrelation value of $S'_3$;
performing FFT transform on $S'_3$ to obtain the spectrum of $S'_3$;
extracting low-frequency bulge parts of the spectrum of $S'_3$ and takes them as filters to filter a Gaussian white noise $n_{\delta/2}$ to obtain a colored noise $n'_{\delta/2}$;
calculating variance $\langle \sin^2(\delta) \rangle$ of sin(δ) according to the autocorrelation value of $S_3$ at the same moment;
locking power of the colored noise $n'_{\delta/2}$ at the variance $\langle \sin^2(\delta) \rangle$ to obtain a random sample $n''_{\delta/2}$ of sin(δ); and
obtaining the random sample $n'''_{\delta/2}$ and the variance $\langle (n'''_{\delta/2})^2 \rangle$ of the phase delay δ/2 according to the random sample $n''_{\delta/2}$ of sin(δ).

12. An optical communications system, comprising:
an apparatus for establishing a transmission impairment decomposition model for the optical communications system, and
an apparatus for estimating a bit error penalty, the apparatus for estimating a bit error penalty comprises:
a memory that stores a plurality of instructions; and
a processor coupled to the memory and configured to:
estimate a bit error penalty introduced into optical signals by total impairments and single impairments in the optical communications system, by using the complete transmission impairment decomposition model; and
determine primary impairments and secondary impairments in the optical communications system according to a magnitude of the bit error penalty introduced by the single impairments;
the apparatus for establishing a transmission impairment decomposition model for the optical communications system comprises:
a memory that stores a plurality of instructions; and
a processor coupled to the memory and configured to:
convert a Jones vector of a test signal after passing through a Raman amplified system into a Stokes vector;
calculate transmission impairments to which the test signal is subjected by using the Stokes vector according to a pre-established transmission impairment decomposition model; and
substitute values of the transmission impairments into the pre-established transmission impairment decomposition model to obtain a complete transmission impairment decomposition model used for estimating transmission impairments,
wherein, the converting comprises:
acquiring the test signal after passing through the Raman amplified system to reconstruct the Jones vector of the test signal as $[E_x, E_y]$;
converting the Jones vector $[E_x, E_y]^T$ into a corresponding Stokes vector $[S_1, S_2, S_3]^T$;
calculating a mean vector $[\langle S_1 \rangle, \langle S_2 \rangle, \langle S_3 \rangle]^T$ of the Stokes vector $[S_1, S_2, S_3]^T$ in a Stokes space; and
performing Stokes space rotation, converting $\langle S_2 \rangle$ and $\langle S_3 \rangle$ of the mean vector $[\langle S_1 \rangle, \langle S_2 \rangle, \langle S_3 \rangle]^T$ into 0 to obtain a new Stokes vector $[S'_1, S'_2, S'_3]^T$, and obtaining an optical intensity $S'_0 = \sqrt{|S'_1|^2 + |S'_2|^2 + |S'_3|^2}$ according to the new Stokes vector $[S'_1, S'_2, S'_3]^T$,
wherein, the transmission impairments comprise at least one of the following: a time-varying gain fluctuation, influence of cross polarization modulation on a polarization state of a signal, influence of cross phase modulation on a phase of a signal, and a dual-polarization ASE noise,
wherein, the pre-established transmission impairment decomposition model is as follows:

$$\begin{bmatrix} E_{x,in} \\ E_{y,in} \end{bmatrix}_{Input\ signal} \rightarrow \begin{bmatrix} G+\Delta & 0 \\ 0 & G+\Delta \end{bmatrix}_{Gain\ fluctuation} \rightarrow \begin{bmatrix} \cos(\delta/2) & -j\sin(\delta/2) \\ -j\sin(\delta/2) & \cos(\delta/2) \end{bmatrix}_{45deg\ Retarder} \rightarrow$$

$$\begin{bmatrix} \cos(\theta) & -\sin(\theta) \\ \sin(\theta) & \cos(\theta) \end{bmatrix}_{Rotator} \rightarrow \begin{bmatrix} e^{j\varphi_{xpm}} & 0 \\ 0 & e^{j\varphi_{xpm}} \end{bmatrix}_{Phase\ noise} \rightarrow \underset{\underset{ASE\ noise}{\begin{bmatrix} n_x \\ n_y \end{bmatrix}}}{\overset{+}{\uparrow}} \rightarrow \begin{bmatrix} E_{x,out} \\ E_{y,out} \end{bmatrix}_{Output\ signal};$$

where, $[E_{x,in}, E_{y,in}]^T$ is a Jones vector of an optical signal before passing through the Raman amplified system, G is a Raman gain, Δ is a time-varying gain fluctuation, 45deg Retarder is influence of cross polarization modulation on a polarization state of a signal in an $S_3$ direction, Rotator is influence of cross polarization modulation on a polarization state of a signal in an $S_2$ direction, Phase noise is influence of cross phase modulation on a phase of a signal, $[n_x, n_x]^T$ is a dual-polarization ASE noise, and $[E_{x,out}, E_{y,out}]^T$ is a Jones vector of the optical signal after passing through the Raman amplified system,
wherein, the calculating comprises:
estimating variance $\langle (n'''_{\varphi xpm})^2 \rangle$ and a random sample $n'''_{\varphi xpm}$ of a phase noise $\varphi_{xpm}$ according to the phase noise $\varphi_{xpm}$ and the phase delay δ/2.

* * * * *